(12) United States Patent
Park et al.

(10) Patent No.: US 8,806,225 B2
(45) Date of Patent: Aug. 12, 2014

(54) MOBILE TERMINAL AND DISPLAY CONTROLLING METHOD THEREIN

(75) Inventors: Hyekyung Park, Seoul (KR); Dongwoo Kim, Seoul (KR); Joowoo Lee, Seoul (KR); Hyehyun Kim, Seoul (KR); Hyunah Cho, Seoul (KR)

(73) Assignee: LG Electronics Inc., Seoul (KR)

( * ) Notice: Subject to any disclaimer, the term of this patent is extended or adjusted under 35 U.S.C. 154(b) by 13 days.

(21) Appl. No.: 13/475,361

(22) Filed: May 18, 2012

(65) Prior Publication Data

US 2013/0007842 A1    Jan. 3, 2013

(30) Foreign Application Priority Data

Jun. 28, 2011   (KR) ........................ 10-2011-0062801

(51) Int. Cl.
*G06F 17/30* (2006.01)
*G11C 5/04* (2006.01)
*G06F 12/14* (2006.01)
*H04L 1/00* (2006.01)

(52) U.S. Cl.
CPC .............. *G11C 5/04* (2013.01); *G11C 2213/78* (2013.01); *H04L 1/0016* (2013.01)
USPC .............................. 713/193; 713/165; 726/30

(58) Field of Classification Search
CPC combination set(s) only.
See application file for complete search history.

(56) References Cited

U.S. PATENT DOCUMENTS

| | | | |
|---|---|---|---|
| 2007/0143260 A1* | 6/2007 | Markov et al. | 707/3 |
| 2009/0119280 A1* | 5/2009 | Waters et al. | 707/5 |
| 2011/0093691 A1* | 4/2011 | Galicia et al. | 713/2 |
| 2012/0240237 A1* | 9/2012 | Kanevsky et al. | 726/26 |
| 2013/0073387 A1* | 3/2013 | Heath | 705/14.53 |

* cited by examiner

*Primary Examiner* — Venkat Perungavoor
(74) *Attorney, Agent, or Firm* — Birch, Stewart, Kolasch & Birch, LLP

(57) ABSTRACT

A mobile terminal including a communication unit configured to communicate with at least one external terminal; a memory configured to store at least first and second operating systems including at least first and second modes, respectively; and a controller configured to execute the first operating system and activate the first mode corresponding to the first operating system, display a first information screen on a display unit of the mobile terminal corresponding to the activated first mode, display an application execution history for the first mode and the second mode on a prescribed region of the first information screen of the first mode, and identifiably display whether applications included in the application execution history were executed in the first mode or the second mode.

20 Claims, 42 Drawing Sheets

```
                                    P mode  — 501
         ┌─────────────────────────┐
         │       Schedule 1        │
         ├─────┬───────────────────┤
         │Contents│                │
         │        │                │
         │        │                │
         ├─────┴───────────────────┤
         │Participants│            │ — 931
         ├─────────┬──────────────┤
         │  Time   │              │ — 932
         └─────────┴──────────────┘

┌────┐
                  │ OK │
                  └────┘
```

(a)

```
                                    B mode  — 502
         ┌─────────────────────────┐
         │       Schedule 2        │
         ├─────┬───────────────────┤
         │Contents│                │
         │        │                │
         │        │                │
         ├─────┴───────────────────┤
         │Participants│            │ — 941
         ├─────────┬──────────────┤
         │  Time   │              │ — 942
         ├────────────┬───────────┤
         │Notifications│E-mail sending│ — 943
         └────────────┴───────────┘

| A | B | C | D |
|---|---|---|---|
| E | . . | . . | . . |
| . . | . . | . . | . . |
| . . | . . | . . | Z |

P mode (a)

| Q | W | E | . . | . . | P |
|---|---|---|---|---|---|
| A | S | . . | . . | . . | L |
| Z | X | . . | . . | . . | M |
| 1 | 2 | . . | . . | . . | O |

B mode (b)

(a) P mode — Configuration settings

Select application to be contained in application execution history.

| P-1 ☑ | P-2 ☐ | P-3 ☑ |
| P-4 ☐ | P-5 ☑ | P-6 ☐ |

OK   All

(b) B mode — Configuration settings

Select application to be contained in application execution history.

| B-1 ☑ | B-2 ☑ | B-3 ☐ |
| B-4 ☑ | B-5 ☐ | B-6 ☑ |

OK   All

FIG. 12B

(a) P mode — Configuration settings

Select a display type of application execution history.

1. Bar
2. List
3. Clock

(b) P mode — Configuration settings

Select a display period of application execution history.

1. Day
2. Week
3. User-specific (a)

(b)

(a)                      (b)

MOBILE TERMINAL AND DISPLAY CONTROLLING METHOD THEREIN

Pursuant to 35 U.S.C. §119(a), this application claims the benefit of earlier filing date and right of priority to Korean Application No. 10-2011-0062801, filed on Jun. 28, 2011, the contents of which are hereby incorporated by reference herein in their entirety.

BACKGROUND OF THE INVENTION

1. Field of the Invention

The present invention relates to a mobile terminal, and more particularly, to a mobile terminal and display controlling method therein. Although the present invention is suitable for a wide scope of applications, it is particularly suitable for implementing a plurality of modes of the mobile terminal.

2. Discussion of the Related Art

Generally, terminals can be classified into mobile/portable terminals and stationary terminals. The mobile terminals can be classified into handheld terminals and vehicle mount terminals again according to possibility of user's direct portability.

As functions of the terminal are diversified, the terminal is implemented as a multimedia player provided with composite functions such as photographing of photos or moving pictures, playback of music or moving picture files, game play, broadcast reception and the like for example.

To support and increase of the terminal functions, it may be able to consider the improvement of structural part and/or software part of the terminal.

Recently, a mobile terminal tends to be used for a business need as well as a personal need. In addition, it is necessary to implement the mobile terminal suitable for both of the personal need and the business need. Moreover, the demand for using the mobile terminal for the purpose of the personal need or the business need separately keeps rising.

However, a mobile terminal according to a related art fails in providing a terminal use environment in accordance with various needs including the personal need, the business need and the like.

SUMMARY OF THE INVENTION

Accordingly, the present invention is directed to a mobile terminal and display controlling method therein that substantially obviate one or more problems due to limitations and disadvantages of the related art.

An object of the present invention is to provide a mobile terminal and display controlling method therein, by which a terminal use environment in accordance with various needs including the personal need, the business need and the like can be provided.

Another object of the present invention is to provide a mobile terminal and display controlling method therein, by which an application execution history in a deactivated mode as well as a currently activated mode can be provided in an activated state of a prescribed mode.

To achieve these objects and other advantages and in accordance with the purpose of the invention, as embodied and broadly described herein, a mobile terminal according to the present invention includes at least one operating system capable of implementing a plurality of modes including a $1^{st}$ mode and a $2^{nd}$ mode, at least one application executed in at least one of a plurality of the modes, a display unit displaying a screen of the $1^{st}$ mode in an activated state of the $1^{st}$ mode, the display unit displaying an application execution history for the $1^{st}$ mode and the $2^{nd}$ mode on a prescribed region of the screen of the $1^{st}$ mode, and a controller controlling the display unit to identifiably display whether the application execution history corresponds to the $1^{st}$ mode or the $2^{nd}$ mode.

In another aspect of the present invention, a method of controlling a display in a mobile terminal, which is capable of implementing a plurality of modes including a $1^{st}$ mode and a $2^{nd}$ mode, includes the steps of activating the $1^{st}$ mode and displaying a screen of the activated $1^{st}$ mode in a manner of displaying an application execution history for the $1^{st}$ mode and the $2^{nd}$ mode on a prescribed region of the screen of the $1^{st}$ mode. In addition, the mobile terminal identifiably displays whether the application execution history corresponds to the $1^{st}$ mode or the $2^{nd}$ mode, Moreover, the mobile terminal includes an operating system capable of implementing a plurality of the modes and at least one application executed in at least one of a plurality of the modes.

Accordingly, the present invention provides the following effects and/or advantages.

First of all, the present invention provides an application execution history in $1^{st}$ and $2^{nd}$ modes can be provided in an activated state of the $1^{st}$ mode.

Secondly, the present invention provides an application execution history in $1^{st}$ and $2^{nd}$ modes can be provided in an activated state of the $1^{st}$ mode, thereby providing information on applications executed in a deactivated mode as well as a currently activated mode.

Thirdly, the present invention can receive an input of a command for switching to another mode or an input of a command for executing an application using an application execution history.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 12A to 12C are diagrams for setting a configuration of an application execution history display according to the present invention;

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

First of all, mobile terminals described in this disclosure can include a mobile phone, a smart phone, a laptop computer, a digital broadcast terminal, a PDA (personal digital assistants), a PMP (portable multimedia player), a navigation system and the like.

Except a case applicable to a mobile terminal only, it is apparent to those skilled in the art that the configurations according to an embodiment described in this disclosure is applicable to such a stationary terminal as a digital TV, a desktop computer and the like.

Figure 1:
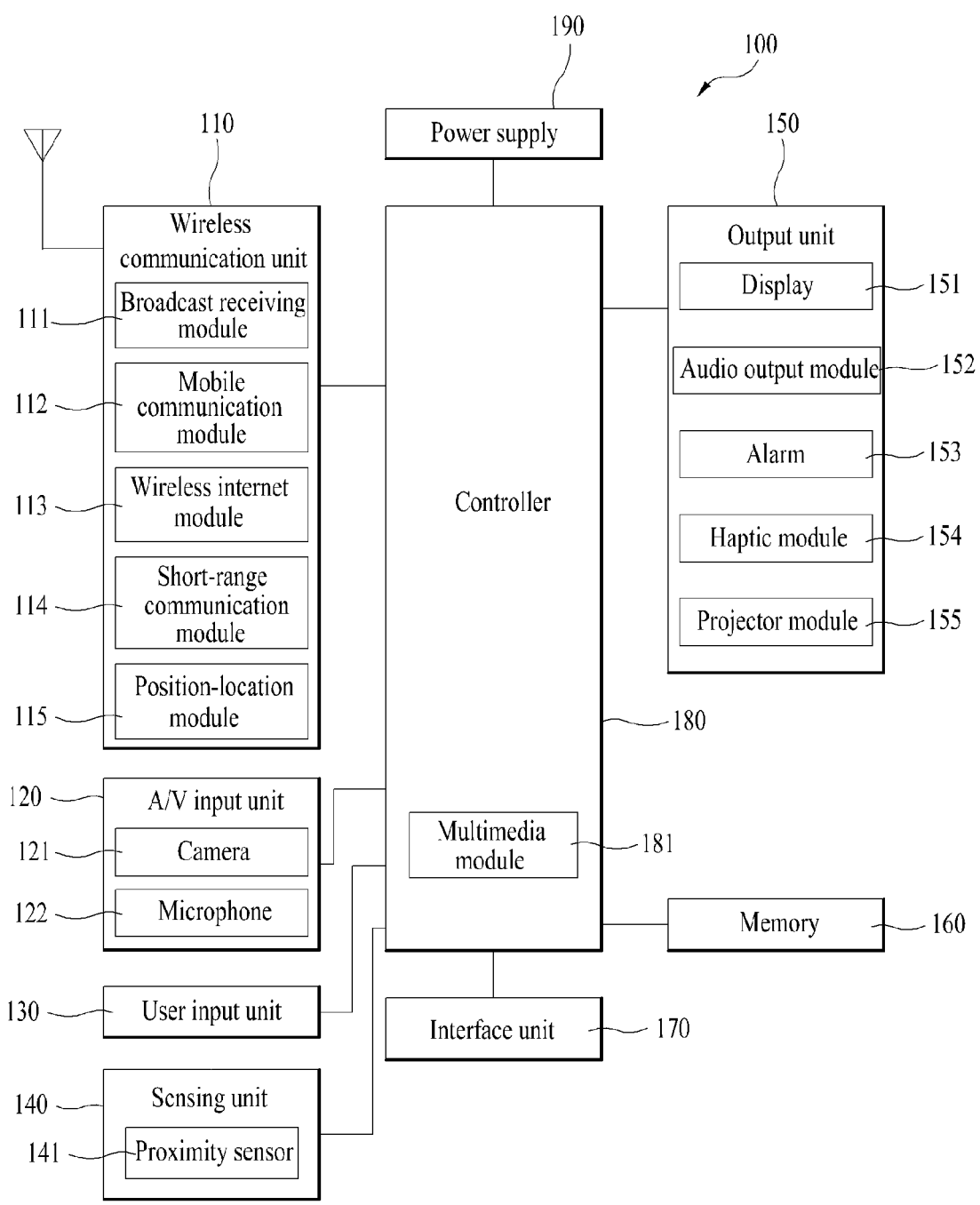
FIG. 1 is a block diagram of a mobile terminal according to one embodiment of the present invention.

FIG. 1 is a block diagram of a mobile terminal according to one embodiment of the present invention.

Referring to FIG. 1, a mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. In addition, the broadcast associated information can be provided via a mobile communication network. In this instance, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceivings, among others.

The wireless internet module 113 supports Internet access for the mobile terminal 100. This module may be internally or externally coupled to the mobile terminal 100. In this instance, the wireless Internet technology can include WLAN (Wireless LAN) (Wi-Fi), Wibro (Wireless broadband), Wimax (World Interoperability for Microwave Access), HSDPA (High Speed Downlink Packet Access), etc.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. In addition, the processed image frames can be displayed on the display unit 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. In addition, the sensing unit 140 can include a proximity sensor 141.

The output unit 150 generates outputs relevant to the senses of sight, hearing, touch and the like. In addition, the output unit 150 includes the display unit 151, an audio output module 152, an alarm unit 153, a haptic module 154, a projector module 155 and the like.

The display unit 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display unit 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display unit 151 can be implemented in the optical transmittive type as well. In this configuration, a user can see an object in rear of a terminal body via the area occupied by the display unit 151 of the terminal body.

At least two display units 151 can be provided to the mobile terminal 100 in accordance with the implemented configuration of the mobile terminal 100. For instance, a plurality of display units can be arranged on a single face of the mobile terminal 100 in a manner of being spaced apart from each other or being built in one body. Alternatively, a plurality of display units can be arranged on different faces of the mobile terminal 100.

When the display unit 151 and a sensor for detecting a touch action (hereinafter called 'touch sensor') configures a mutual layer structure (hereinafter called 'touchscreen'), it cause the display unit 151 as an input device as well as an output device. In this instance, the touch sensor can be configured as a touch film, a touch sheet, a touchpad or the like.

The touch sensor can be configured to convert a pressure applied to a specific portion of the display unit 151 or a variation of a capacitance generated from a specific portion of the display unit 151 to an electric input signal. Moreover, it can configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 can know whether a prescribed portion of the display unit 151 is touched.

Referring to FIG. 1, a proximity sensor (not shown in the drawing) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. When the touchscreen includes the electrostatic capacity proximity sensor, it is configured to detect the proximity of a pointer using a variation of electric field according to the proximity of the pointer. In this instance, the touchscreen (touch sensor) can be classified as the proximity sensor.

In the following description, for clarity, an action that a pointer approaches without contacting with the touchscreen to be recognized as located on the touchscreen is named 'proximity touch'. In addition, an action that a pointer actually touches the touchscreen is named 'contact touch'. The meaning of the position on the touchscreen proximity-touched by the pointer means the position of the pointer which vertically opposes the touchscreen when the pointer performs the proximity touch.

The proximity sensor detects a proximity touch and a proximity touch pattern (e.g., a proximity touch distance, a proximity touch duration, a proximity touch position, a proximity touch shift state, etc.). In addition, information corresponding to the detected proximity touch action and the detected proximity touch pattern can be output to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 can output a signal for announcing the event occurrence by way of vibration as well as video or audio signal. The video or audio signal can be output via the display unit 151 or the audio output unit 152. Hence, the display unit 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be output in a manner of being synthesized together or can be output in sequence.

The haptic module 154 can generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. In addition, the projector module 155 can display an image, which is identical to or partially different at least from the image displayed on the display unit 151, on an external screen or wall according to a control signal of the controller 180.

In particular, the projector module 155 can include a light source (not shown in the drawing) generating light (e.g., laser) for projecting an image externally, an image producing means (not shown in the drawing) for producing an image to output externally using the light generated from the light source, and a lens (not shown in the drawing) for enlarging to output the image externally in a predetermined focus distance. In addition, the projector module 155 can further include a device (not shown in the drawing) for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. In addition, it is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. In addition, a recent use history or a cumulative use frequency of each data (e.g., use frequency for each phonebook, each message or each multimedia) can be stored in the memory unit 160. Moreover, data for various patterns of vibration and/or sound output in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. In addition, the mobile terminal 100 can operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (TAM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals input from the cradle by a user to the mobile terminal 100. Each of the various command signals input from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 can perform a pattern recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2A:
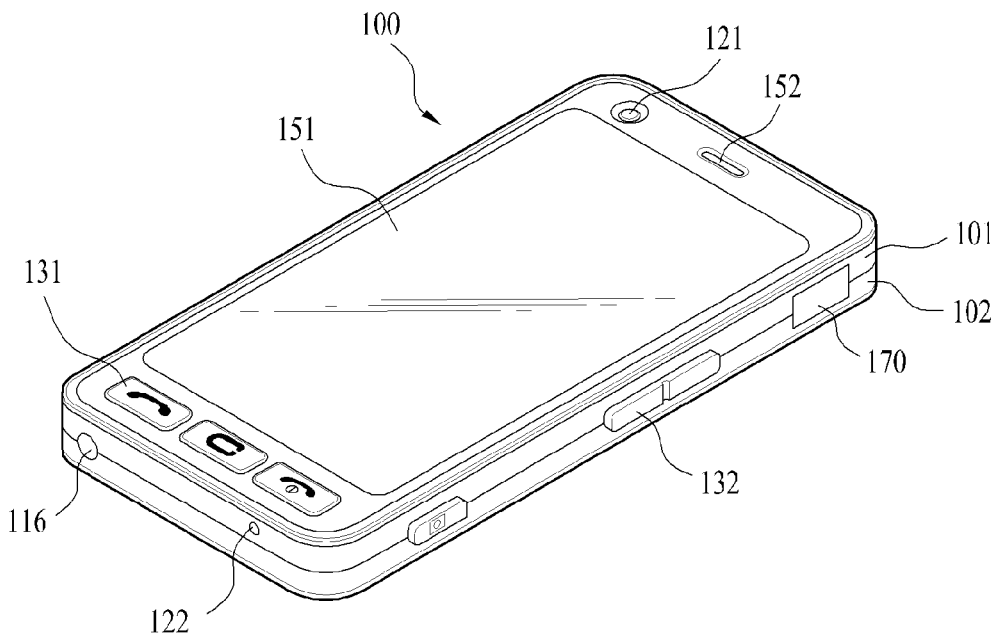
FIG. 2A is a front perspective diagram of a mobile terminal according to one embodiment of the present invention.

FIG. 2A is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2A, the mobile terminal 100 includes a case (casing, housing, cover, etc.) configuring an exterior thereof. In the present embodiment, the case can be divided into a front case 101 and a rear case 102. Various electric/electronic parts are loaded in a space provided between the front and rear cases 101 and 102. Optionally, at least one middle case can be further provided between the front and rear cases 101 and 102 in addition.

The cases 101 and 102 are formed by injection molding of synthetic resin or can be formed of metal substance such as stainless steel (STS), titanium (Ti) or the like for example.

A display unit 151, an audio output unit 152, a camera 121, user input units 130/131 and 132, a microphone 122, an interface 180 and the like can be provided to the terminal body, and more particularly, to the front case 101.

The display unit 151 occupies most of a main face of the front case 101. The audio output unit 151 and the camera 121 are provided to an area adjacent to one of both end portions of the display unit 151, while the user input unit 131 and the microphone 122 are provided to another area adjacent to the other end portion of the display unit 151. The user input unit 132 and the interface 170 can be provided to lateral sides of the front and rear cases 101 and 102.

The input unit 130 is manipulated to receive a command for controlling an operation of the terminal 100. In addition, the input unit 130 can include a plurality of manipulating units 131 and 132. The manipulating units 131 and 132 can be named a manipulating portion and may adopt any mechanism of a tactile manner that enables a user to perform a manipulation action by experiencing a tactile feeling.

Content input by the first or second manipulating unit 131 or 132 can be diversely set. For instance, such a command as start, end, scroll and the like is input to the first manipulating unit 131. In addition, a command for a volume adjustment of sound output from the audio output unit 152, a command for a switching to a touch recognizing mode of the display unit 151 or the like can be input to the second manipulating unit 132.

Figure 2B:
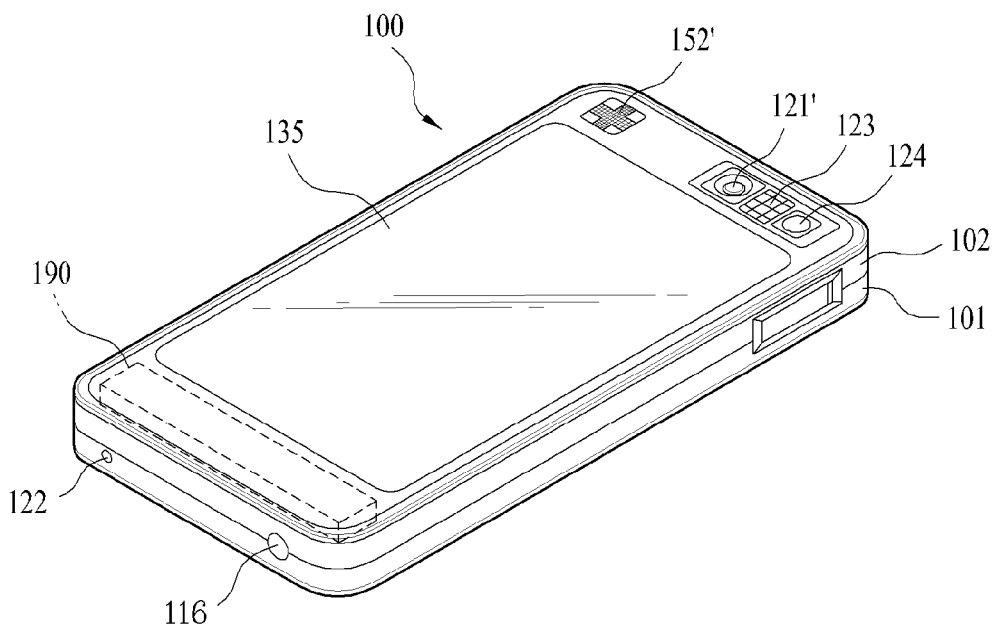
FIG. 2B is a rear perspective diagram of a mobile terminal according to one embodiment of the present invention.

FIG. 2B is a perspective diagram of a backside of the terminal shown in FIG. 2A.

Referring to FIG. 2B, a camera 121' can be additionally provided to a backside of the terminal body, and more particularly, to the rear case 102. The camera 121 has a photographing direction that is substantially opposite to that of the former camera 121 shown in FIG. 21A and may have pixels differing from those of the firmer camera 121.

Preferably, for instance, the former camera 121 has low pixels enough to capture and transmit a picture of user's face for a video call, while the latter camera 121' has high pixels for capturing a general subject for photography without transmitting the captured subject. In addition, each of the cameras 121 and 121' can be installed at the terminal body to be rotated or popped up.

A flash 123 and a mirror 124 are additionally provided adjacent to the camera 121'. The flash 123 projects light toward a subject when photographing the subject using the camera 121'. When a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' can implement a stereo function together with the former audio output unit 152 shown in FIG. 2A and may be used for implementation of a speakerphone mode in talking over the terminal.

A broadcast signal receiving antenna 124 can be additionally provided to the lateral side of the terminal body as well as an antenna for communication or the like. The antenna 124 constructing a portion of the broadcast receiving module 111 shown in FIG. 1 can be retractably provided to the terminal body.

A power supply unit 190 for supplying a power to the terminal 100 is provided to the terminal body. In addition, the power supply unit 190 can be configured to be built within the terminal body. Alternatively, the power supply unit 190 can be configured to be detachably connected to the terminal body.

A touchpad 135 for detecting a touch can be additionally provided to the rear case 102. The touchpad 135 can be configured in a light transmittive type like the display unit

151. In this instance, if the display unit 151 is configured to output visual information from its both faces, it can recognize the visual information via the touchpad 135 as well. The information output from both of the faces can be entirely controlled by the touchpad 135. Alternatively, a display is further provided to the touchpad 135 so that a touchscreen can be provided to the rear case 102 as well.

The touchpad 135 is activated by interconnecting with the display unit 151 of the front case 101. The touchpad 135 can be provided in rear of the display unit 151 in parallel. The touchpad 135 can have a size equal to or smaller than that of the display unit 151.

First of all, a mobile terminal mentioned in the following description can include at least one of the components shown in FIG. 1. In addition, in order to perform an operation using the components (e.g., touchscreen, wireless communication unit, memory, etc.), the controller 180 can control an individual operation of each of the components or interconnected operations among a plurality of the components.

Applications mentioned in this disclosure are software programs drivable in a mobile terminal. If the application is driven, it can execute a corresponding function or operation. The application is basically stored in the mobile terminal (particularly, memory 160) or can be downloaded from an external server of an external terminal.

For example, the applications can include a compass, an augmented reality, a camera, a video player, a music player, a game, a news, a web browser, a message, a phonebook, a memo, a schedule management, and the like. Of course, the allocations are non-limited by this example and can be implemented in more various ways.

There can exist contents or data associated with the applications as well. In this instance, the associated content or data is stored in the memory 160 or can be stored in an external server having a storage space.

For instance, the contents can include an audio file (associated with the music player), a video file (associated with the video player), a document file (associated with an e-book), and the like. In addition, the data can include a message content (associated with the message), a memo content (associated with the memo), contact information (associated with the phonebook), a schedule content (associated with the schedule management), and the like.

According to the present invention, a mobile terminal can configure a plurality of modes differing from each other in application configuration for data security for one mode against another mode or data security between different modes. In addition, the mobile terminal according to the present invention can implement a plurality of the modes selectively or simultaneously (or sequentially).

When a specific application is executed in a prescribed mode, at least one application interoperable with the specific application can be executed in the prescribed mode. For instance, if a specific application is a voice call, an application interoperable with the voice call can include a phonebook, a message and the like.

Regarding mode discrimination in application configuration, an application executable in each of a plurality of modes can include at least one application (hereinafter named a dedicated application) executable by being dedicated to each of a plurality of the modes or at least one application (hereinafter named a common application) executable in any one of a plurality of the modes. In particular, the common application can change at least one feature in each of a plurality of the modes in which the corresponding application is executable. For instance, at least one of configuration, representation, security and the like of the common application is changeable. This shall be described in detail later.

Of course, the common application may not change its feature in each of a plurality of the modes in which the corresponding application is executable. For instance, if the common application includes such a basic terminal application as a voice call, a message and the like, it may not change its feature.

For example, if first to third applications are executed in a first mode and if the third application, a fourth application and a fifth application are executed in a second mode, the first and second applications, the third application and the fourth and fifth application can be called the dedicated applications of the first mode, the common application of the first and second modes and the dedicated applications of the second mode, respectively.

A plurality of modes can include a first mode (i.e., a private mode) facilitating user's personal life, a second mode (i.e., a business mode) facilitating a user's work life, and the like. This enables a mobile terminal to be discriminatively used in consideration of a user's personal life (e.g., privacy) and a user's public life (e.g., work life). In particular, in aspect of security reinforcement, when either a private mode or a business mode is implemented, restriction can be put on an access to information corresponding to the other mode.

The above-described private mode and the business mode are just the examples for describing a plurality of the modes. If the above-described private mode and the business mode are suitable for the mode discrimination reference mentioned in this disclosure, they are non-limited by their names. Although the mode discrimination of a plurality of the modes is explained in the above description based on the application configuration, it shall be described in detail with reference to the accompanying drawings later.

Implementation and activation of a plurality of modes mentioned in the description of the present invention shall be defined as follows.

First of all, according to the present invention, a mobile terminal can implement a plurality of modes all and is also able to activate one of a plurality of the currently implemented modes. For instance, if a plurality of the modes include a first mode and a second mode, the mobile terminal boots an operating system capable of implementing both of the first and second modes to implement and can then activate the implemented first or second mode selectively.

In particular, if both of the first and second modes are already implemented, the mode for displaying an execution screen on a current screen, the mode for designating the currently executed application, the mode having a high priority or the like can be called an activated mode. In this instance, a non-activated mode (or a deactivated mode) can be regarded as operating as a background despite being implemented in the mobile terminal. In more particular, if an execution screen of the first mode and an execution screen of the second mode are being displayed on a first region and a second region of the screen through screen partition, respectively, the mode selected by a user, the mode for activating the corresponding region currently, the mode for designating a currently executed application, the mode having a high priority or the like can be regarded as activated.

Occasionally, after the mobile terminal has implemented and activated one mode, if the mobile terminal attempts to switch the current mode to the other mode, the mobile terminal can implement and activate the other mode (i.e., selective implementation and activation of mode).

In the following description, implementation of a plurality of modes and operations of components required for inter-mode switching for a plurality of the modes are explained in detail with reference o FIGS. 3A to 4C.

Figure 3A:
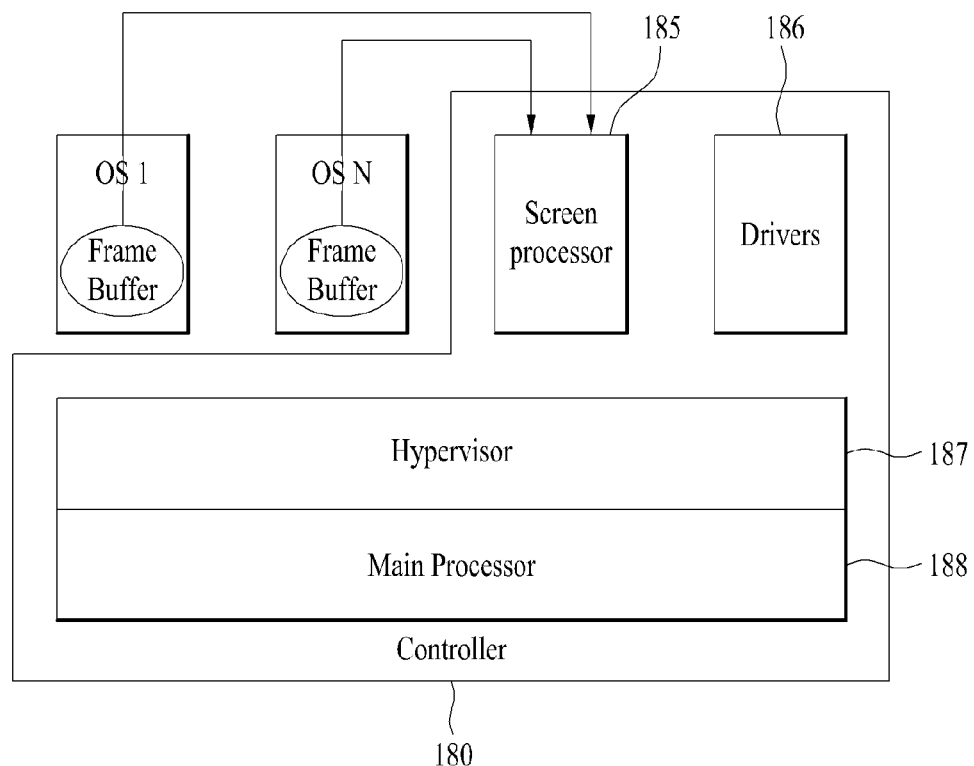
FIGS. 3A to 3C are block diagrams of components required for implementation of a plurality of modes and a mode switching among a plurality of the modes according to the present invention.
Figure 3B:
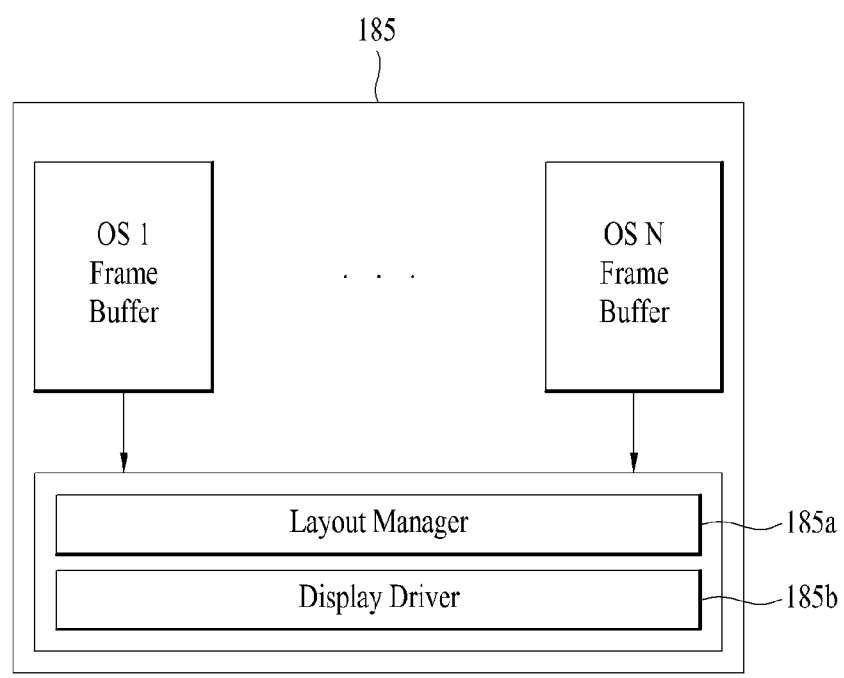
Figure 3C:
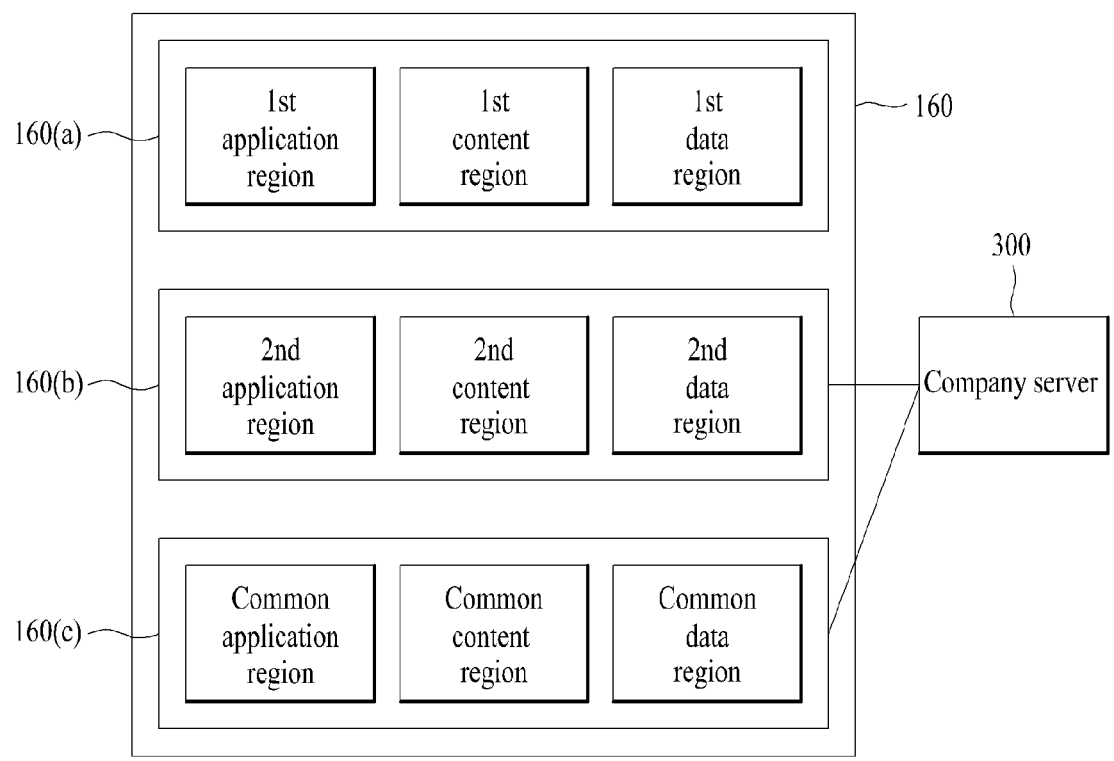

FIGS. 3A to 3C are block diagrams of components required for implementation of a plurality of modes and a mode switching among a plurality of the modes according to the present invention.

FIG. 3A is a block diagram of a controller 180 for driving a plurality of operating systems (OSs) and configuring a dedicated screen of a plurality of operating systems. In addition, FIG. 3B is a block diagram of a screen processor 185 shown in FIG. 3A. In particular, FIG. 3A and FIG. 3B show a case that a plurality of the operating systems are provided in parallel with each other (cf. FIG. 4A (a), FIG. 4B).

According to the present invention, a plurality of the modes can be implemented by a plurality of the operating systems, respectively. In particular, the operating system for supporting implementation can differ per mode.

Referring to FIG. 3A, a controller 180 can include a screen processor 185, a driver 186, a hypervisor 187 and a main processor 188. In this instance, the hypervisor 187 can be called such a terminology as a virtual engine (virtual machine), a virtualizing module (virtualization), a virtual engine monitor (virtual machine monitor), a virtualization module monitor (virtualization monitor) and the like. This terminology is just exemplary. In addition, a component capable of performing the same function of the hypervisor 187 is non-limited by the corresponding terminology.

A frame buffer is provided to each of a plurality of the operating systems stored in the memory 160. If a plurality of the operating systems are driven, the screen processor 185 receives a frame corresponding to a dedicated screen of the corresponding operating system from each of the frame buffers and then determines whether to display the dedicated screen of a prescribed one of the operating systems on a screen of the display unit 151 under the control of the main processor 188.

Under the control of the main processor 188, the screen processor 185 displays the dedicated screen of the specific operating system on the whole screen of the display unit 151 (e.g., when implementing one mode only). Alternatively, the screen processor 185 generates one integrated frame by combining and/or editing the frames received from the frame buffers and can then display an integrated dedicated screen including all the dedicated screens of a plurality of the operating systems (e.g., when implementing a plurality of the modes).

Referring to FIG. 3A, a plurality of the operating systems OS1, . . . OS N are prepared in parallel with each other, which can be described in detail with reference to FIG. 4A (a) and FIG. 4B as follows.

Figure 4A:
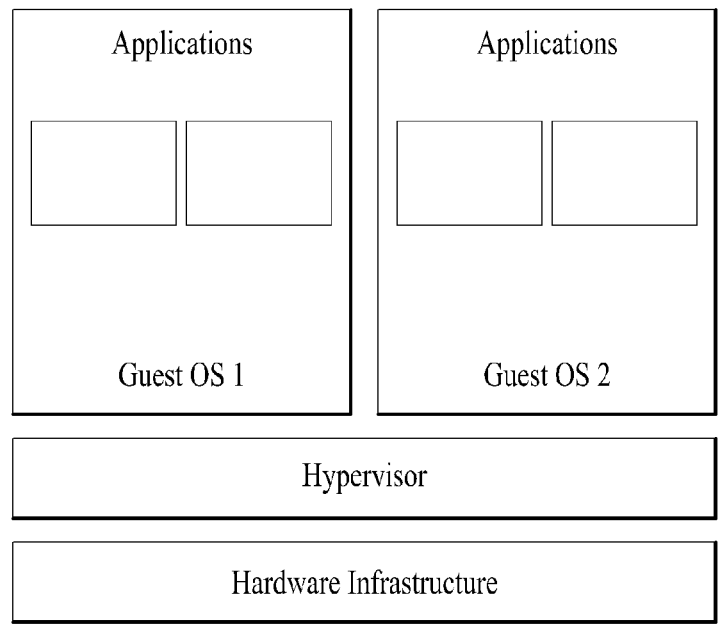
FIGS. 4A to 4C are block diagrams of components required for operating a plurality of operating system for implementing a plurality of modes according to the present invention.
Figure 4A:
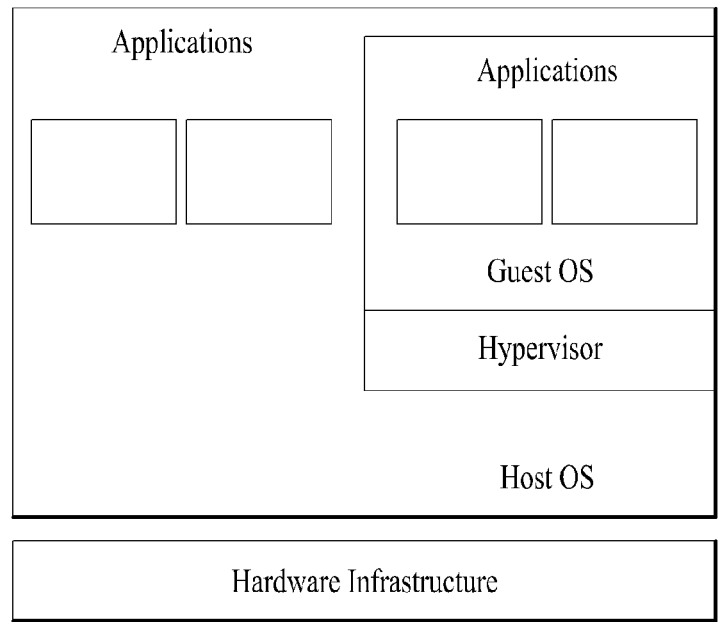
Figure 4B:
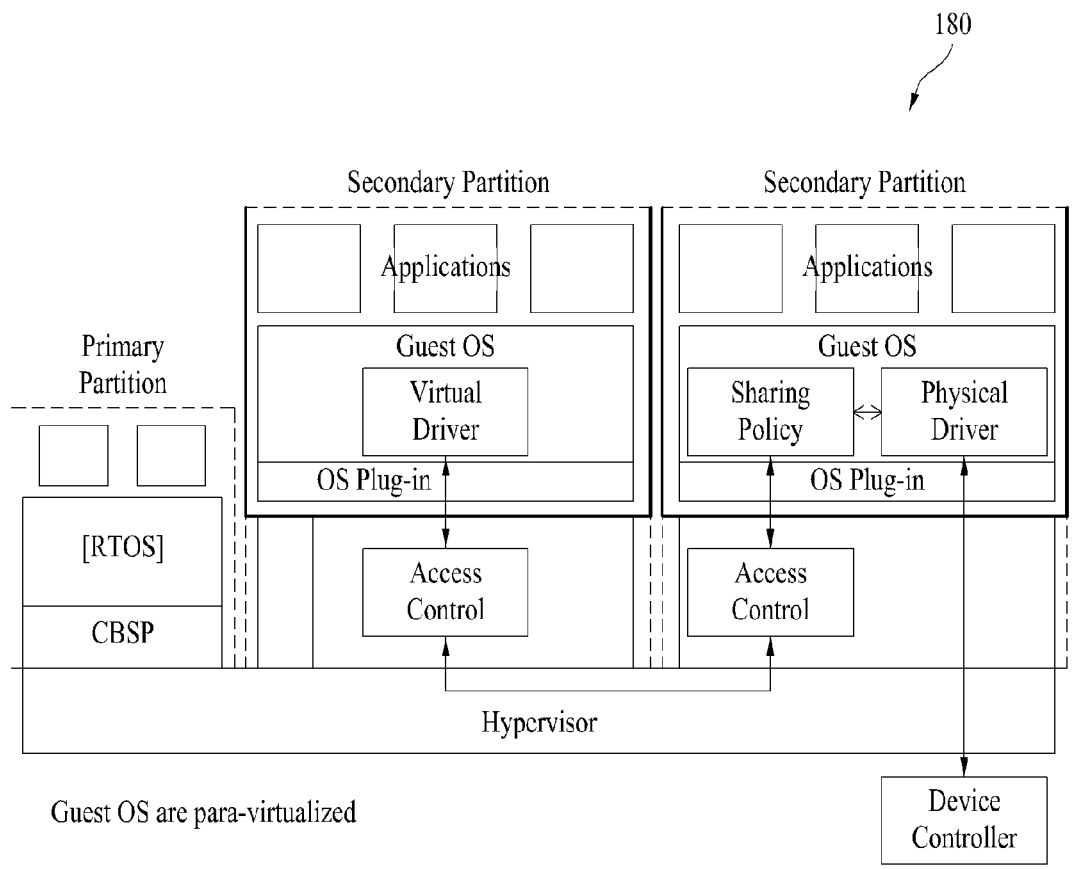

FIG. 4A (a) and FIG. 4B show a scheme of booting a plurality of operating systems Guest OS 1 and Guest OS 2 respectively supporting different modes in parallel by loading a hypervisor (hereinafter named a first scheme).

Referring to FIG. 4A (a) and FIG. 4B, the mobile terminal 100 can implement Guest OS 1 and Guest OS 2 selectively, sequentially or simultaneously. In addition, a different mode can be designated to each of the Guest OS 1 and the Guest OS 2. In this instance, the operation of the Guest OS 1 and the Guest OS 2 and the corresponding mode activation can be performed by the hypervisor. The components shown in FIG. 4B can perform general operations related to the virtualization engine technology.

Multi-OS booting and mode activation corresponding to the multi-OS booting are described in detail as follows. First of all, in case (1) of activating a mode corresponding to the currently booted Guest OS 1 or Guest Os 2 or in case (2) of booting the Guest OS 1 corresponding to first mode and the Guest OS 2 corresponding to a second mode sequentially or simultaneously, the controller 180 (particularly, the hypervisor) implements and activates either the first mode or the second mode (2-1) or can activate either the first or second mode despite implementing both of the first and second modes (2-2).

Referring now to FIG. 3, the screen processor 185, includes a layout manager 185a and a display driver 185b (FIG. 3B). Under the control of the main processor 188, the layout manager 185a generates one integrated frame by combing or editing the frames received from the frame buffers and the display driver 185b then controls the frame generated by the layout manager 185a to be displayed on the display unit 151.

The driver 186 controls the entire operating systems to be driven. The hypervisor 187 is a middleware between the main processor 188 and each of the operating systems and includes a virtualization engine configured to a plurality of the operating systems to be usable in the mobile terminal 100 according to the present invention. In addition, the main processor 188 controls all operations related to the driving of a plurality of the operating systems according to the present invention.

As mentioned in the above description, the screen processor 185, the driver 186, the hypervisor 187 and the main processor 188 can be included in the controller 180 or can be stored as software in the memory 160.

FIG. 3C is a block diagram of the memory 160 having a database storage region corresponding to each of a plurality of the modes.

According to the present invention, the mobile terminal can manage the database storage regions of a plurality of the modes discriminatively. In particular, when a plurality of the modes are implemented by the different operating systems, respectively, the mobile terminal can manage the database storage regions of a plurality of the modes discriminatively.

Generally, when at least one operating system capable of implementing a first mode and a second mode is provided, the memory 160 is able to store an application corresponding to each of the at least one operating system. Therefore, the provided at least one or more operating systems can be booted selectively or simultaneously under the control of the controller 180.

For instance, the operating system can include such a commercial OS as Android OS, Linux based OS, Windows Mobile OS, Apple OS and the like. In addition, a dedicated application can be differently set for each of the operating systems. In addition, a multi-OS can include different kinds of operating systems (e.g., Android OS, Apple OS, etc.) and the same kinds of operating systems (e.g., 2.1 version of Android OS, 2.2 version of Android OS, etc.) differing from each other in version.

According to the present invention, assuming that both of the first mode and the second mode can be implemented, the memory 160 can include a first database storage region 160(a) corresponding to the first mode, a second database storage region 160(b) corresponding to the second mode, and a common database storage region 160(c) in common with the first mode and the second mode. Occasionally, the common database storage region 160(c) can be omitted. In this instance, a commonly-designated application and content or data associated with the corresponding application can be stored in the database storage region of the corresponding mode.

In particular, in configuring the first, second and common database storage regions, the mobile terminal 100 uses memories different from each other in hardware as the storage regions, puts restriction on accessing the storage regions per mode despite providing the storage regions within a same memory, or can discriminate the storage regions from each other using a storage partition per mode.

In this instance, the same operating system implements the first mode and the second mode or different operating systems can implement the first mode and the second mode, respectively. Moreover, at least two or modes can be implemented by the mobile terminal 100. If so, the database storage regions can be further subdivided.

In particular, the first database storage region 160(*a*) can include a region (i.e., a first application region) for storing at least one first application executable in the first mode, a region (i.e., a first content region) for storing a content associated with the first application and a region (i.e., a first data region) for storing data associated with the first application.

In addition, the second database storage region 160(*b*) can include a region (i.e., a second application region) for storing at least one second application executable in the second mode, a region (i.e., a second content region) for storing a content associated with the second application and a region (i.e., a second data region) for storing data associated with the second application.

Moreover, the common database storage region 160(*c*) can include a region (i.e., a common application region) for storing at least one common application executable in both of the first mode and the second mode, a region (i.e., a common content region) for storing a content associated with the common application and a region (i.e., a common data region) for storing data associated with the common application.

When the second mode is a business mode that facilitates a user's public life, information stored in the second database storage region 160(*b*) and information corresponding to the second mode in the common database storage region 160(*c*) can be utilized only if the corresponding information is stored in a manner of being shared with a company server 300, the corresponding information is stored in the company server 300 (i.e., the second database storage region 160(*b*) is unnecessary) or the company server 300 is accessed. In this instance, the company server 300 can include a server of a company, for which a user works, a server of a specific company designated by a user (or a company where the user works), or the like.

While the first mode is activated, the mobile terminal 100 can utilize the information stored in the first database storage region 160(*a*) and the information corresponding to the first mode in the common database storage region 160(*c*). While the second mode is activated, the mobile terminal 100 can utilize all the information stored in the first, second and common database storage regions 160(*a*), 160(*b*) and 160(*c*).

Alternatively, while the second mode is activated, the mobile terminal 100 can utilize the information stored in the first database storage region 160(*a*) and the information corresponding to the second mode in the common database storage region 160(*c*). While the first mode is activated, the mobile terminal 100 can utilize all the information stored in the first, second and common database storage regions 160(*a*), 160(*b*) and 160(*c*).

Optionally, it can control the mobile terminal 100 not to utilize the information on the first mode in the course of the activated second mode.

Besides, although the drawing shows that the application region, the content region and the data region are situated in the database storage region, the application region, the content region and the data region can be integrated together if necessary.

Figure 4C:
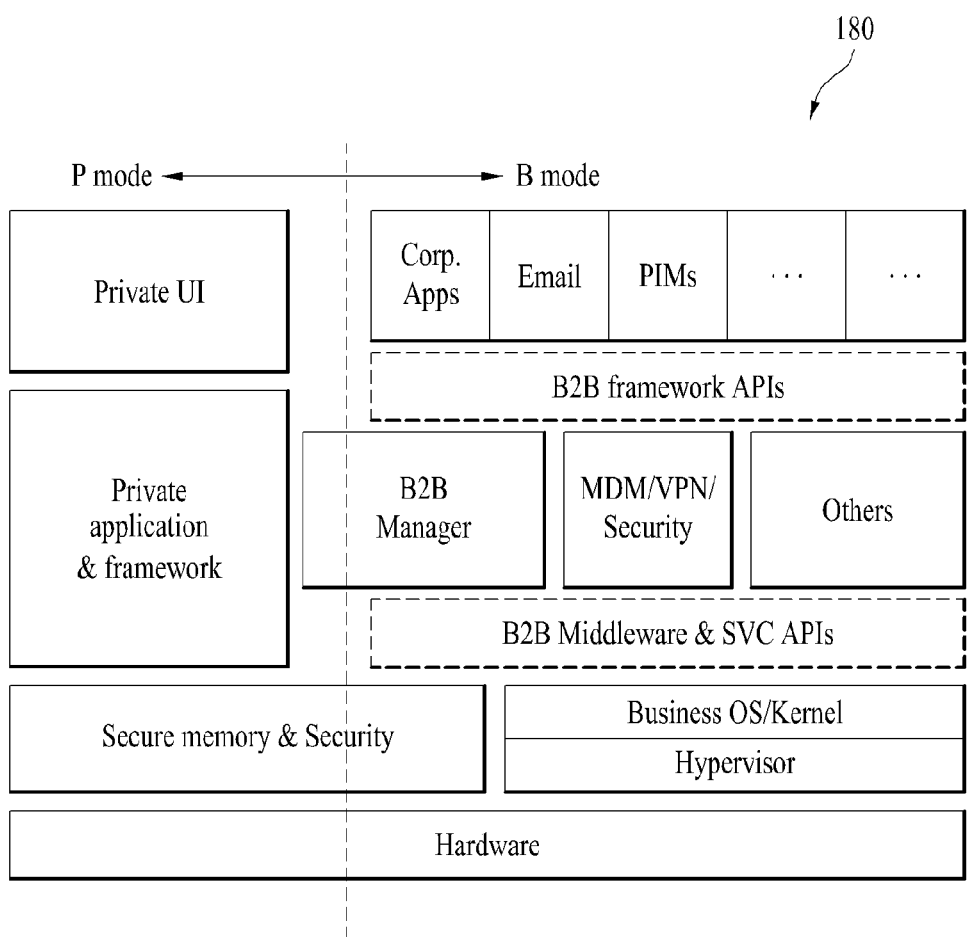

FIG. 4A (*b*) and FIG. 4C show a scheme of driving a hypervisor on a Host OS for supporting one mode to boot a Guest OS for supporting another mode (hereinafter named a second scheme). In particular, a mode supported by the Host OS can include a private mode. In addition, a mode supported by the Guest OS can include a business mode.

In more particular, referring to FIG. 4C, a B2B manager can perform a switching operation between a private mode (hereinafter abbreviated a P mode) and a business mode (hereinafter abbreviated a B mode). Components shown in a P mode region of the two regions partitioned by a dotted line can operate in case of the private mode implementation, components shown in the B mode region can operate in case of the business mode implementation, and components included in both of the modes can operate in both of the modes.

According to the present invention, the mobile terminal 100 can implement a plurality of modes on an operating system selectively, simultaneously or sequentially. A different operating system (hereinafter named an individual operating system) is designated to each of a plurality of the modes or a common operating system can be designated to a plurality of the modes. Specifically, implementation of a plurality of the modes can be controlled by the hypervisor 187.

In particular, a currently implemented or activated mode in accordance with an individual or common operating system is defined as follows. For clarity and convenience of the following description, assume that a plurality of modes include a first mode and a second mode. Of course, at least two or more modes can exist if necessary.

First of all, when a common operating system is booted, the controller 180 implements and activates either the first mode or the second mode (1) or can activate either the first mode or the second mode despite implementing both of the first and second modes.

When an individual operating system is booted, the controller implements and activates a mode corresponding to a currently booted individual operating system (1), implements and activates a mode corresponding to one of the first mode and the second mode when booting a first operating system corresponding to the first mode and a second operating system corresponding to the second mode sequentially or simultaneously (2-1), or activates either the first mode or the second mode despite implementing both of the first mode and the second mode (2-2).

In the following description, how to discriminate a plurality of modes from each other is explained in detail.

First of all, according to the present invention, each of a plurality of modes can be discriminated by at least one of a mode indicator, a database storage region, an operating system, a user access authority, an application configuration, a content configuration, a data configuration, an application feature, an application group, a group identifier and the like.

A case of discriminating a plurality of modes using a mode indictor according to a first embodiment is explained as follows.

First of all, each of a plurality of modes can have an indicator different to indicate a corresponding mode. An indicator per mode is basically stored in the mobile terminal 100 or can be downloaded from an external server or an external terminal. The indicator per mode is set or selected by a user or can be randomly set by the controller 180.

For instance, each of a plurality of the modes can have a different one of a mode icon, a mode image, a background image, a background color/brightness, a letter font/color/size, a home screen picture (number of pages and page indicator included), an application arrangement structure (e.g., the number of applications included in one home screen, etc.), an application identifier, an LED color, an alarm sound such as a bell sound and the like, a keypad type (backlight color of keypad included), a mode switching key zone, a group identifier (described later) and the like. Of course, those examples of the mode indicator are just exemplary and can include all display elements for discriminating a mode.

This is explained in detail with reference to FIGS. 5A to 5D. For clarity and convenience of the following description, assume that a first mode and a second mode include a private mode and a business mode, respectively. In addition, assume that either the private mode or the business mode is in an active state.

FIGS. 5A to 10C are diagrams for discriminating a plurality of modes according to the present invention.

Figure 5A:
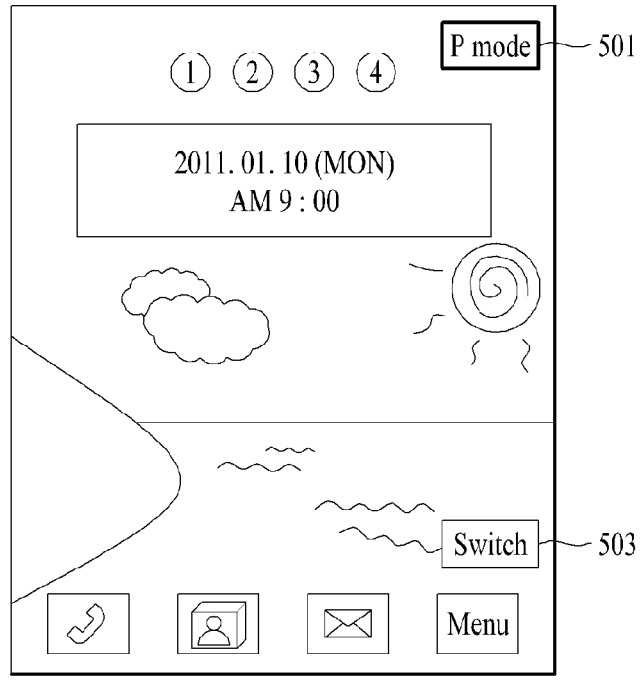
FIGS. 5A to 10C are diagrams for discriminating a plurality of modes according to the present invention.
Figure 5A:
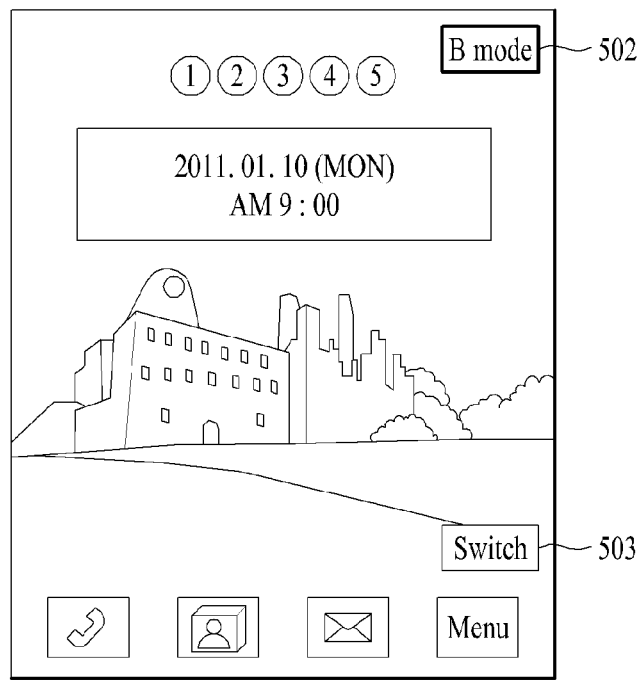

Referring to FIG. 5A, if a personal mode is currently activated, the mobile terminal 100 can display an icon (P mode) 501 corresponding to the private mode on a prescribed region of a screen (FIG. 5A (a)). If a business mode is currently activated, the mobile terminal 100 can display an icon (B mode) 502 corresponding to the business mode on a prescribed region of a screen (FIG. 5A (b)).

Figure 5B:
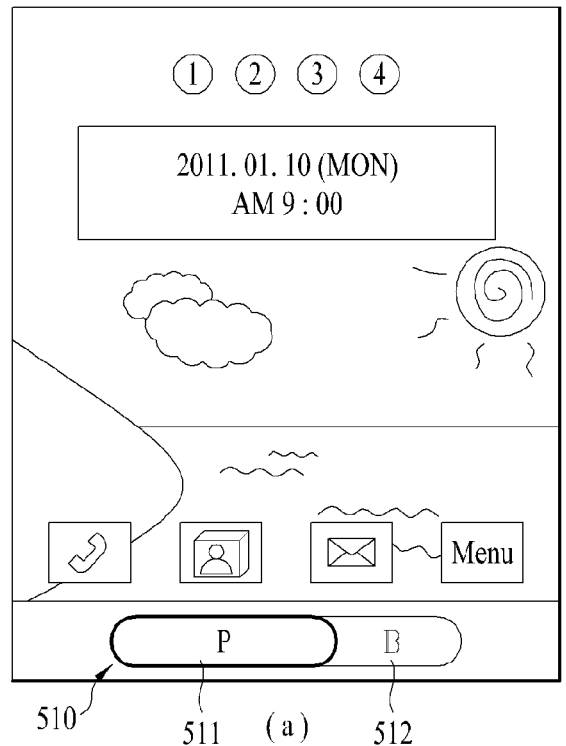
Figure 5B:
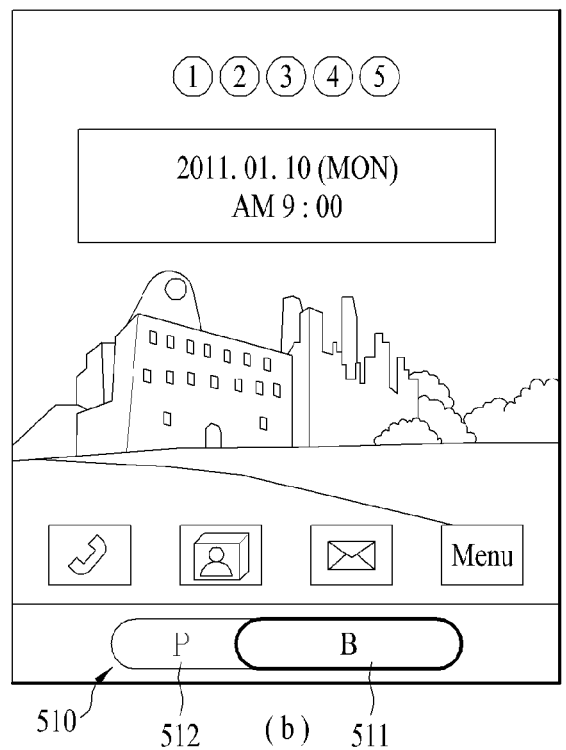

Referring to FIG. 5B, the mobile terminal 100 includes a mode switching key region 510 provided to a prescribed region of the screen. If the private mode is currently activated, the mobile terminal 100 can discriminatively display a zone (P) 511 corresponding to the private mode in the mode switching key region 510 (FIG. 5B (a)). If the business mode is currently activated, the mobile terminal 100 can discriminatively display a zone (B) 512 corresponding to the business mode in the mode switching key region 510 (FIG. 5B (b)).

Figure 5C:
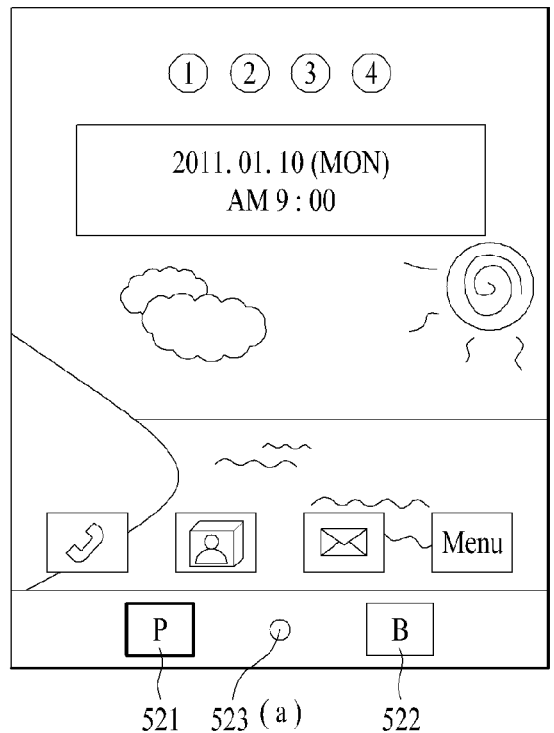
Figure 5C:
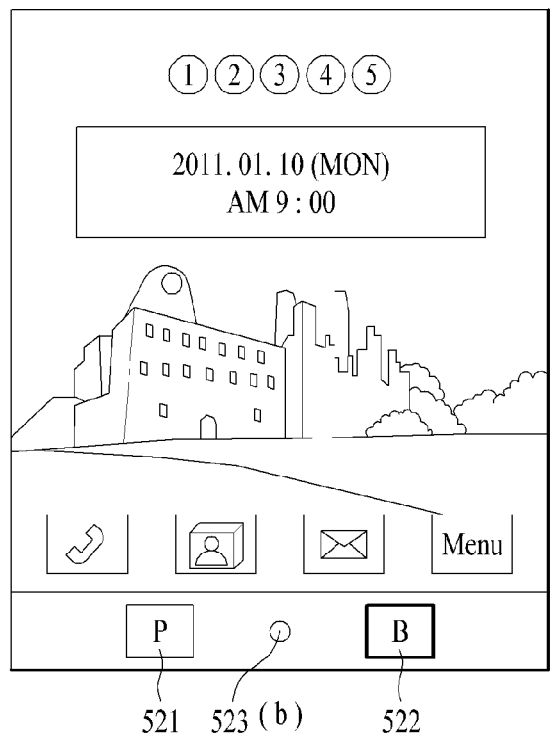

Referring to FIG. 5C, a private mode zone 521, a business mode zone 522 and a switching command zone 523 are provided to the screen of the mobile terminal 100. If the private mode is currently activated, the mobile terminal 100 can discriminatively display the private mode zone (P) 521 (FIG. 5C (a)). If the business mode is currently activated, the mobile terminal 100 can discriminatively display the business mode zone (B) 522 (FIG. 5C (b)).

Figure 5D:
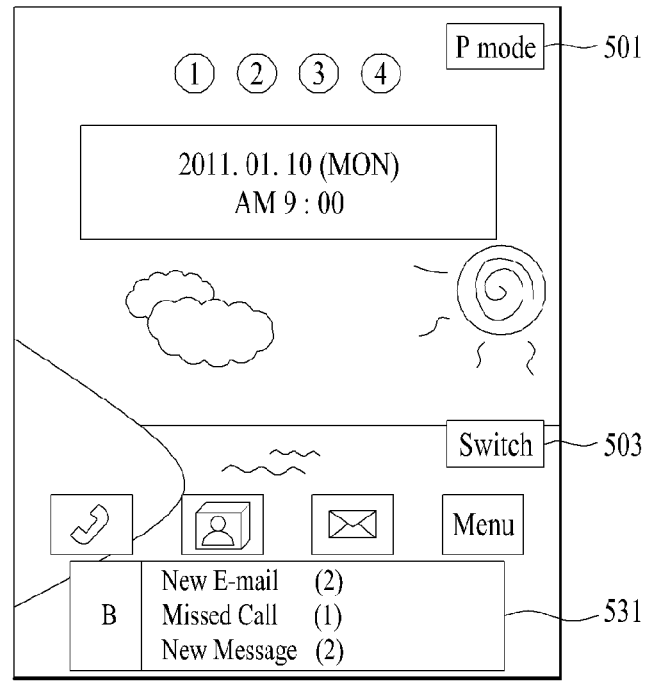
Figure 5D:
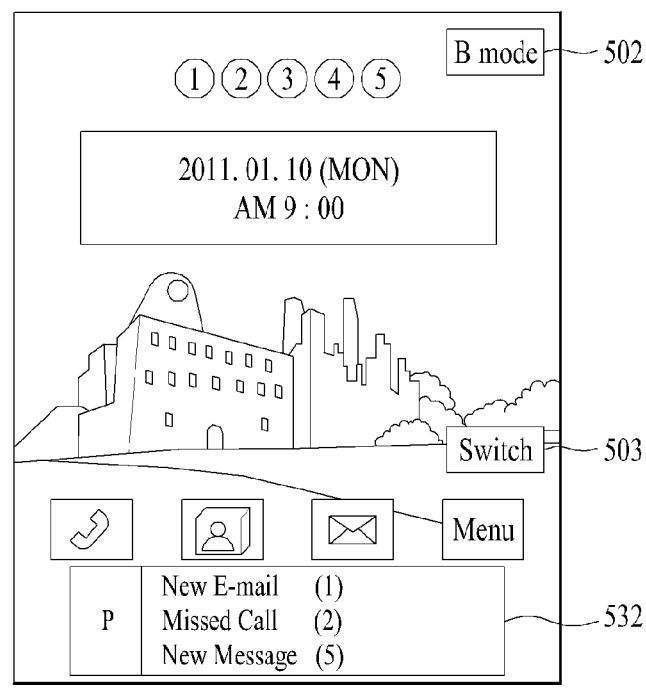

Referring to FIG. 5D, if the private mode is currently activated, the mobile terminal 100 can display an announcement window 531 for announcing events (e.g., email, message, call, etc.) occurring in association with the business mode or the number of the events (or, occurrence time, contact information, etc.) on a prescribed region of the screen (FIG. 5D (a)). If the business mode is currently activated, the mobile terminal 100 can display an announcement window 532 for announcing events (e.g., email, message, call, etc.) occurring in association with the private mode or the number of the events (or, occurrence time, contact information, etc.) on a prescribed region of the screen (FIG. 5D (b)).

In the following description, a case of discriminating a plurality of modes using a database storage region according to a second embodiment is explained.

First of all, a plurality of the modes can discriminatively have database storage regions within the memory 160, respectively (cf. FIG. 3C).

Each of a plurality of the modes can utilize the information stored in the corresponding database storage region or the corresponding information stored in the common database storage region only. Moreover, it can set the information on one mode not to be utilized in other modes. Besides, one (e.g., business mode) of a plurality of the modes can utilize information on another mode (e.g., private mode), whereas the latter mode can be set not to use the information on the former mode.

If the information on the first mode can be utilized in the second mode (yet, the first mode is unable to utilize the information on the second mode), it can be said that an access restriction is put on the second mode or that a higher security level is set on the second mode (described later).

This is explained in detail with reference to FIGS. A to 7B as follows. For clarity and convenience of the following description, assume that a first mode and a second mode include a private mode and a business mode, respectively. Assume that either the private mode or the business mode is in an active state. In addition, assume that a common application of the first and second modes is currently executed.

Figure 6A:
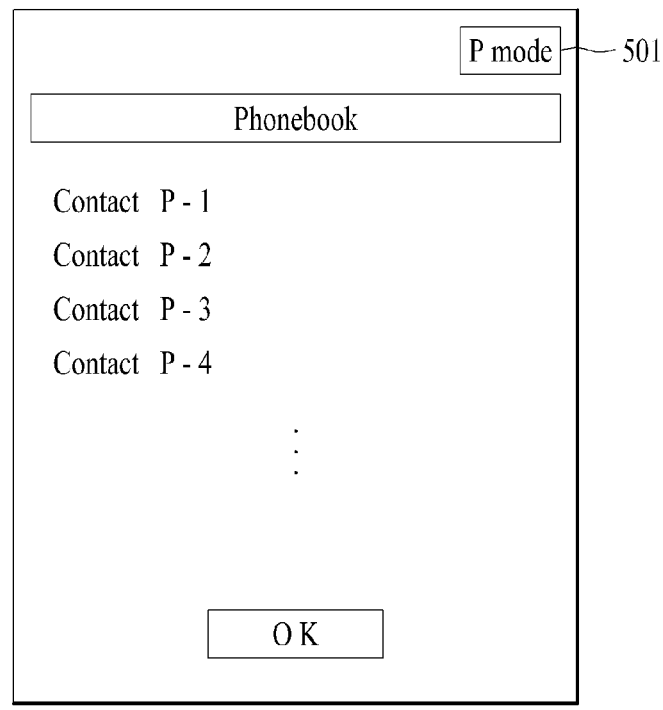

Referring to FIG. 6A, when a phonebook (example of a common application) is being executed in the private mode, the mobile terminal 100 extracts contact information corresponding to the private mode from contact information associated with the phonebook only and can then display the extracted contact information.

Figure 6B:
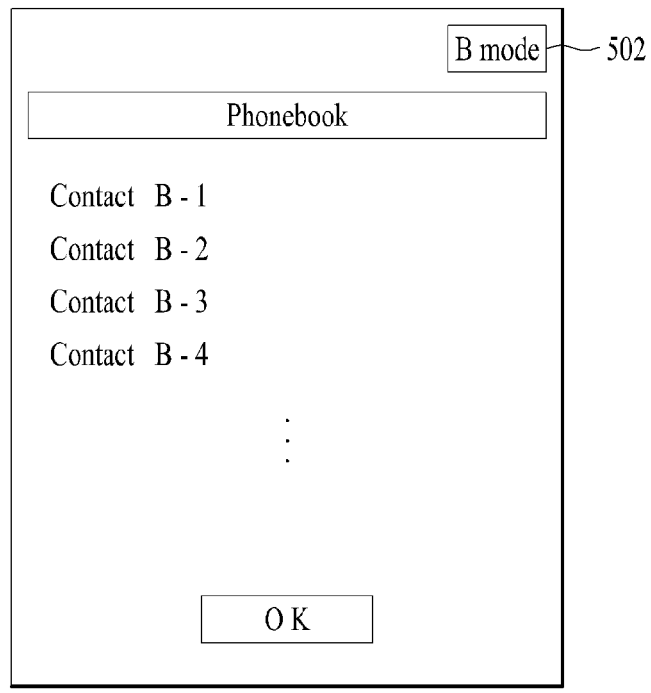
Figure 6B:
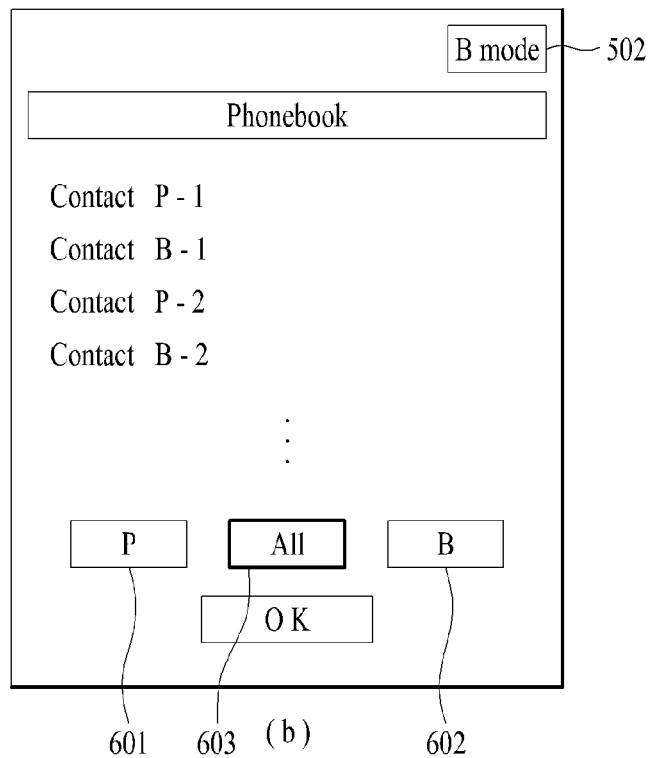

Referring to FIG. 6B, when executing a phonebook in the private mode, the mobile terminal 100 extracts contact information corresponding to the business mode from contact information associated with the phonebook and then displays the extracted contact information (FIG. 6B (a)). Alternatively, the mobile terminal 100 extracts contact information corresponding to either the private mode or the business mode and can then display the extracted contact information (FIG. 6B (b)).

In particular, FIG. 6B (b) shows a case that a zone (All) 603 is activated. If a privacy zone (P) 601 is activated, the mobile terminal 100 can selectively display the contact information corresponding to the private mode only. If a business zone (B) 602 is activated, the mobile terminal 100 can selectively display the contact information corresponding to the business mode only.

Figure 7A:
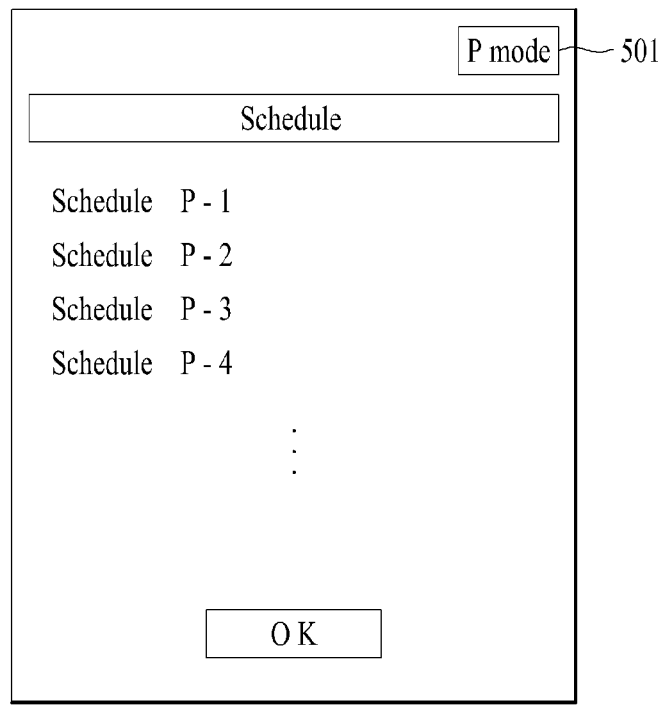

Referring to FIG. 7A, when a schedule management (example of a common application) is being executed in the private mode, the mobile terminal 100 extracts schedules corresponding to the private mode from schedules associated with the schedule management only and can then display the extracted schedules.

Figure 7B:
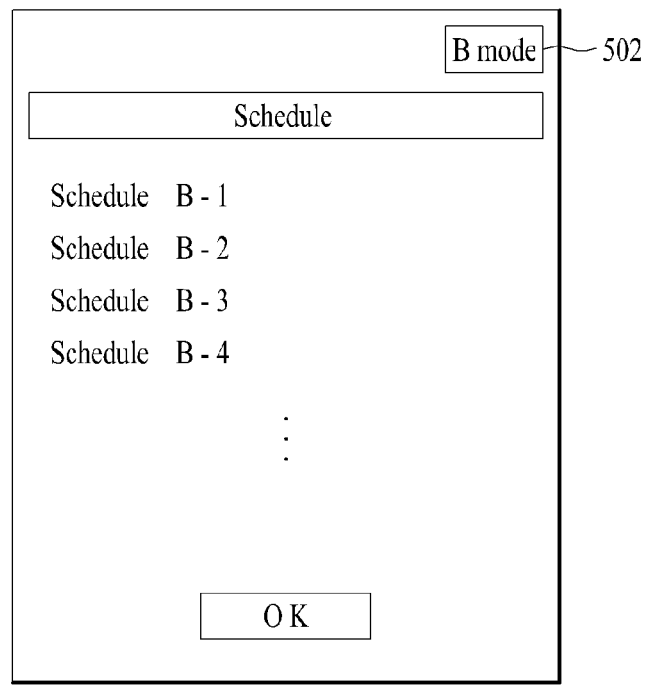
Figure 7B:
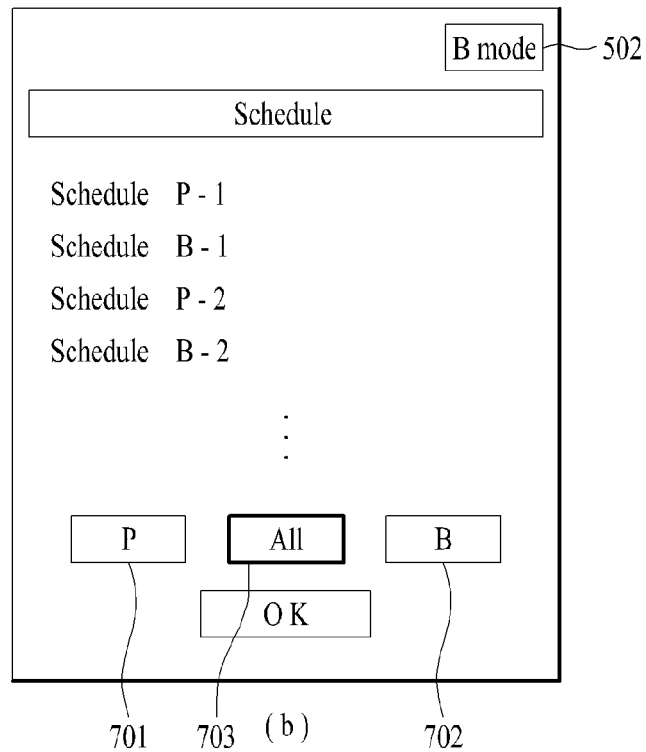

Referring to FIG. 7B, when executing a schedule management in the private mode, the mobile terminal 100 extracts schedules corresponding to the business mode from schedules associated with the schedule management and then displays the extracted schedules (FIG. 7B (a)). Alternatively, the mobile terminal 100 extracts schedules corresponding to either the private mode or the business mode and can then display the extracted schedules (FIG. 7B (b)).

In particular, FIG. 7B (b) shows a case that a zone (All) 703 is activated. If a privacy zone (P) 701 is activated, the mobile terminal 100 can selectively display the schedules corresponding to the private mode only. If a business zone (B) 702 is activated, the mobile terminal 100 can selectively display the schedules corresponding to the business mode only.

Specifically, referring to FIGS. 6A to 7B, although the private mode is unable to access the information on the business mode or the database storage region storing the information on the business mode, the business mode can freely access the information on the private mode or the database storage region storing the information on the private mode.

According to a third embodiment, each of a plurality of modes can be discriminated by a corresponding user access authority. For clarity and convenience of the following description, assume that a plurality of the modes include a first mode and a second mode.

Regarding each of a plurality of the modes, as a different security level is set, a user access authority can be changed (1). Regarding each of a plurality of the modes, if an access restriction is put on one mode but an access restriction is not put on the other mode, a user access authority can be changed (2).

For this, in order to enter a specific one of a plurality of the modes, an authentication procedure can be requested. Hence, the specific mode can be entered only if a valid authentication procedure is performed to enter the specific mode. In particular, if an access restriction or a security level over a predetermined reference is put on the specific mode, an authentication procedure can be requested.

For instance, in a mode having a high user access authority, information corresponding to a mode having a low user access authority or a database storage region of the corresponding information is freely accessed and can be freely utilized. On the contrary, in a mode having a low user access authority, it is unable to access information corresponding to a mode having a high user access authority or a database storage region of the corresponding information.

When entering or switching to a mode having a high user access authority, an input of a user authentication information is requested. If a valid user authentication information is input, the mobile terminal 100 can enter or switch to the mode having the high user access authority (example of an authentication procedure). In case of a mode having a low security level, the mobile terminal 100 is requested to input a user authentication information (e.g., name, social security number, etc.) of a low level. In case of a mode having a high security level, the mobile terminal 100 is requested to input a user authentication information (e.g., name, social security number, specific touch pattern, specific password, etc.) of a high level.

Regarding management (e.g., input, inquiry, editing, etc.) of information (e.g., content, data, etc.) on an application in accordance with a user access authority, three kinds of cases are described in detail as follows. For clarity and convenience of the following description, assume that a plurality of modes include a first mode and a second mode.

First of all, according to a first case, there can exist applications to which contents or data can be input regardless of a mode. For instance, the content or data inputtable application can include such an application for performing a basic function in using a terminal as a schedule management, a scheduler, an email, a message, a messenger, a conference call, a video call, an internet, a phonebook and the like.

According to a second case, like the first case, an information input is possible without mode discrimination. Yet, it can discriminate a database storage region per mode (cf. FIG. 3C).

In particular, inter-mode information exchange is impossible but unilateral information exchange is possible. For instance, an information transfer from a private mode to a business mode is possible but an information transfer from a business mode to a private mode is impossible. In another instance, by setting a plurality of modes to different security levels, respectively, an information transfer from a low level to a high level is possible but an information transfer from a high level to a low level is impossible.

In case of a specific situation, an external terminal having a predetermined authority in a remote place deletes information (e.g., application, content, data, etc.) on a specific mode only or can shut down the specific mode itself. For instance, the specific situation can include one of a case that an employee takes out a terminal without authorization, a case that a terminal is stolen, a case that a unregistered storage medium is loaded in a terminal, a case that a terminal accesses an unsubscribed network, and the like.

Furthermore, regarding a user access authority, it can differentiate an authority for accessing an application, a content, a data or the like, which is available for a business mode, in accordance with a user level (e.g., the user level is determined in consideration of rank in company, duty attribute in company, department in company, etc.) of the mobile terminal 100. In addition, it can also differentiate a function for a specific application. For instance, when a user level (e.g., a group head) is equal to or higher than a predetermined reference, an approval grant function is usable. Yet, when a user level (e.g., a company employee) is lower than a predetermined reference, an approval grant function is deactivated. Moreover, the same application can have a usable content/data that differs in accordance with a user level or the same content/data can have a different range of the provided information in accordance with a user level (e.g., a different data field can be configured in accordance with a user level). Besides, in accordance with a user's authority, an icon associated with a job failing to belong to the corresponding authority is not displayed on a terminal itself. Even if the icon is displayed on the terminal, it can be set not to be executed.

According to a third case, there can exist application (e.g., dedicated applications) accessible to corresponding information as well as operable in either a first mode or a second mode.

For instance, for security matters in a business mode, a photographing function is restricted, a conditional access to a network is granted, or a print function is blocked. In case of the business mode, a business related application is provided. In case of a private mode, the business related application may not be provided. Of course, in case of the private mode, a privacy related application is provided. In case of the business mode, the privacy related application may not be provided.

Meanwhile, there can exist a content or application specialized in a unilateral mode only. For instance, the application specialized for the business mode can include a company business related application. In addition, the company business related application can perform a function of an upload to a company server, a function of a download to the company server and the like.

In addition, it can put an access restriction (or entry) per mode in accordance with a place or time. For instance, it can set a business mode not to be entered at home. In another instance, it can set a private mode not to be entered on a specific time zone. Occasionally, a separately authorized person can enter the business mode at home or the private mode at office on a specific time zone.

Moreover, since an interface is provided to be shared with users in the business mode, information can be shared with the users. If the business mode is switched to the private mode, the interface provided for the information sharing can be shut down.

Furthermore, there can exist one hardware module (e.g., a common module) usable for a plurality of modes in common or another hardware module (e.g., a dedicated module) usable for a specific one of a plurality of the modes. Hence, if a first mode is currently activated, a common module and a dedicated mode of the first mode are activated, while a dedicated module of a second module is not activated. In this instance, the common module and the dedicated module are designated in accordance with a user selection or can be designated by a decision made by the controller 180 or the company server 300.

For instance, assuming that a first mode and a second mode are a private mode and a business mode, respectively, a common module can include one of a mobile communication module 112 for call and message transmission and reception, a power supply unit 190, a display unit 151, a memory 160 and the like. A dedicated module of the private mode can include one of a camera 121, a position location module 115 and the like. In addition, a dedicated module of the business mode can include a projector module 155 or the like. The above examples of the communication module and the dedicated module are just exemplary, by which the communication module and the dedicated module are non-limited. In addition, the communication module and the dedicated module can be configured in more various ways.

In the following description, a user access authority is explained in detail with reference to FIG. 8A and FIG. 8B. For clarity and convenience of the following description, assume a case that the same content is accessed.

Figure 8A:
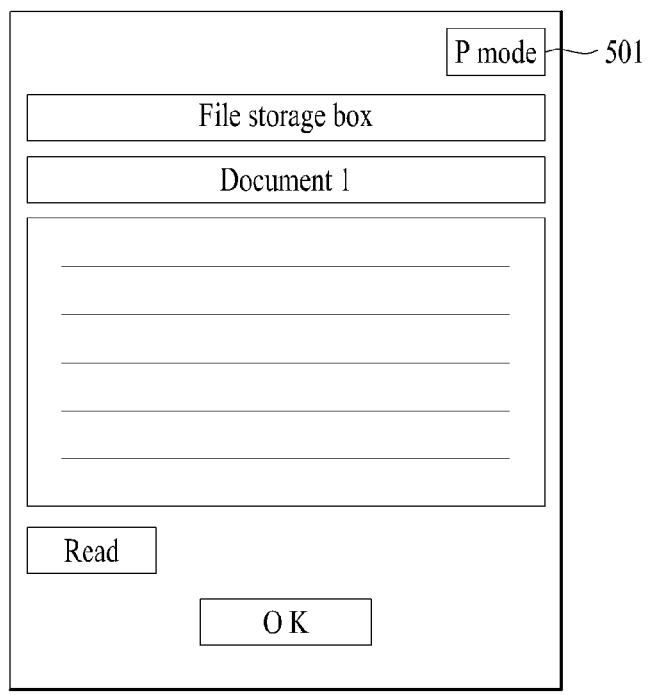
Figure 8A:
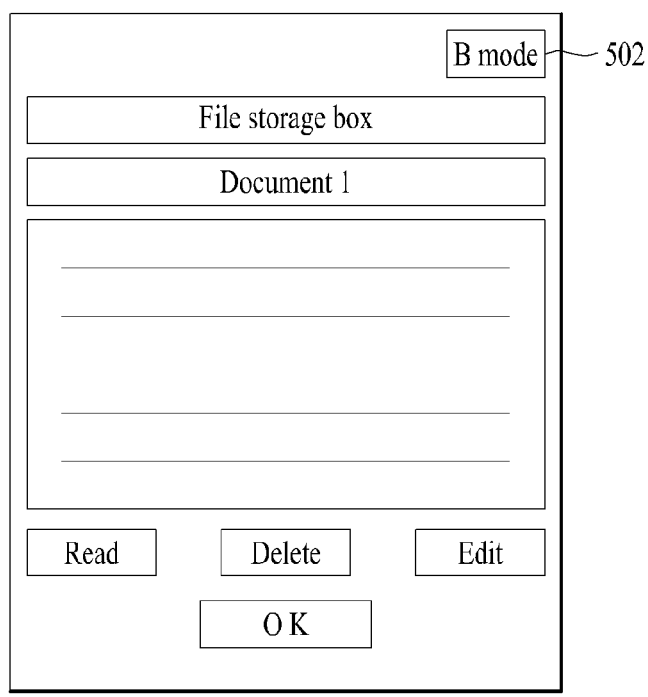

Referring to FIG. 8A, when a document 1 (example of content) is accessed in a private mode, the mobile terminal 100 can grant 'read authority' for the document 1 (FIG. 8A (a)). When a document 1 is accessed in a business, the mobile terminal 100 can grant 'read authority, delete authority, edit authority' for the document 1 (FIG. 8A (b)). Moreover, if a user is authorized over a predetermined level in a company, an approval authority can be granted to the user for the document 1 that requires approval or authorization.

Figure 8B:
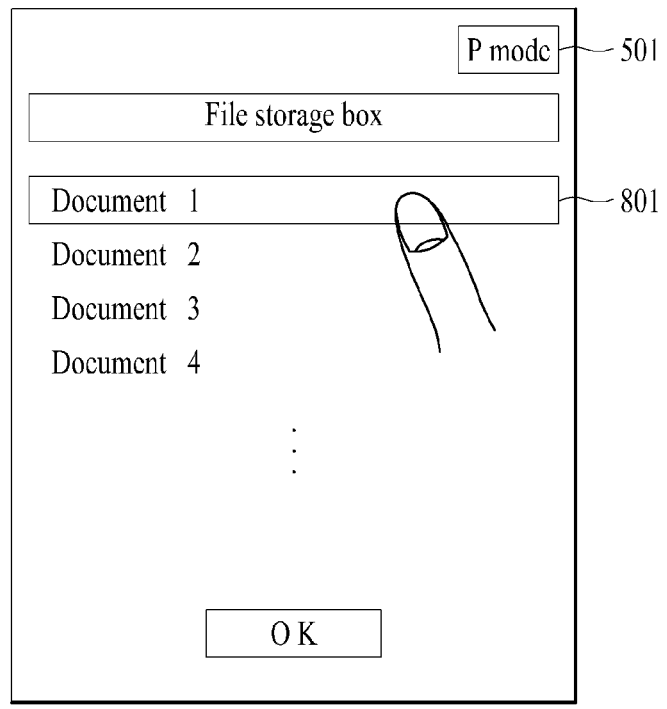
Figure 8B:
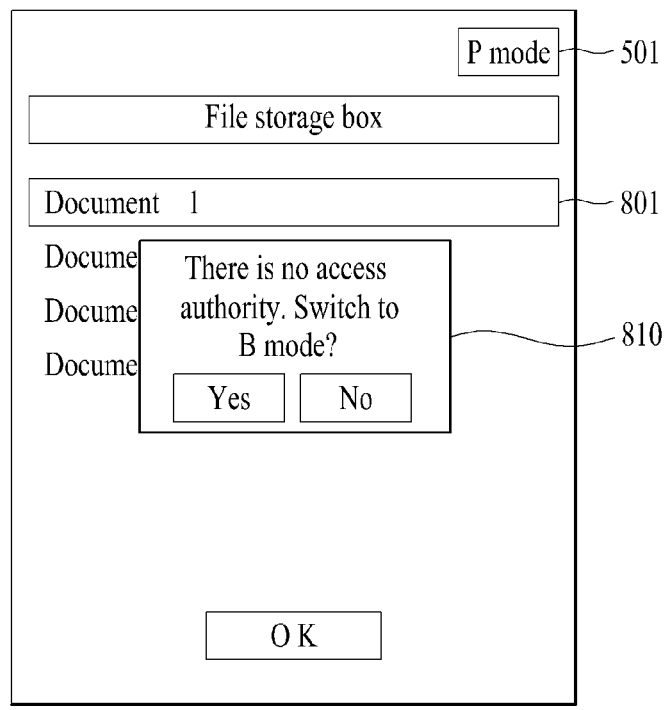

Referring to FIG. 8B, when a file 1 (example of content) corresponding to a business mode is selected from a file list in a private mode (FIG. 8B (a)), the mobile terminal 100 informs a user that there is no access authority on the file 1 and enables the user to select whether to switch the private mode to the business mode to check the file 1 (FIG. 8B (b)).

Of course, in case of the private mode in FIG. 8B, a file corresponding to the business mode may not be included in the file list. In addition, it can display an indictor, which indicates that the file corresponds to the privacy/business mode, on the file list.

Although the user access authority is set per mode in the above description, it can be set per application, content or data if necessary. Therefore, a user authorized with the user access authority can check the same content, whereas an unauthorized user is unable to check the same content.

According to a fourth embodiment, each of a plurality of modes can be discriminated in accordance with at least one of an application configuration, a content configuration and a data configuration.

Each of a plurality of the modes can configure an application different per mode. Even if an application is a common application, each of a plurality of the modes can configure a content or data corresponding to the application differently.

In this instance, if the configuration of the application is different, it means that at least one application (hereinafter named a first dedicated application) dedicated to a first mode and at least one application (hereinafter named a common application) in common with the first mode and a second mode are executed in the first mode or it can mean that at least one application (hereinafter named a second dedicated application) dedicated to the second mode and at least one application (hereinafter named a common application) in common with the first mode and the second mode are executed in the second mode (cf. FIG. 10C).

If the configuration of the content/data is different, it can include both a situation that a substance of the content/data is different and a situation that a substance of the content/data is different in part. Specifically, the latter situation can mean that a substance of a specific content corresponding to each of the first mode and the second mode is different even if the specific content is designated to both of the first mode and the second mode. This is enabled in a manner of configuring a data field different per mode for the same content or data.

This is explained in detail with reference to FIG. 9A and FIG. 9B as follows.

Figure 9A:
Figure 9A:

Referring to FIG. 9A, in storing the same contact information, the mobile terminal 100 designates different phone numbers 911 and 921 and different emails 912 and 922 to a private mode and a business mode, respectively, designates a blog address 913 and a birthday information 914 to the private mode, and designates an approval authority 923, a rank 924 and a department 925 to the private mode.

Referring to FIG. 9B, in storing the same schedule, even if a content and participant information 931 and a content and participant information 941 are identically designated to a private mode and a business mode, respectively, the mobile terminal 100 can further designate a time information 932 to the private mode and is also able to further designate a conference room information 942 and a notification 943 to the business mode.

Figure 10B:
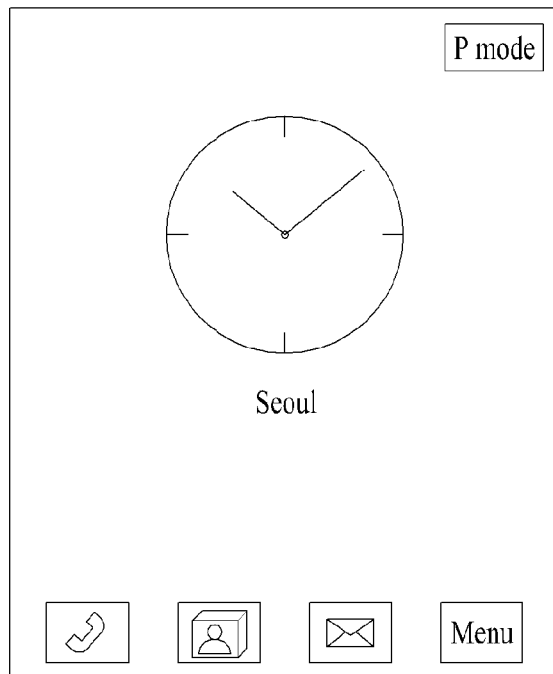
Figure 10B:
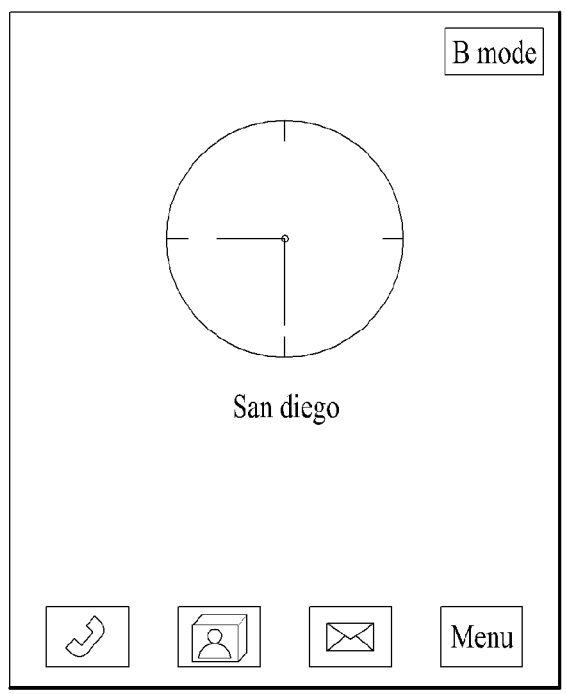

The mobile terminal 100 can set a keypad type different per mode (FIG. 10A) or can set a time zone different per mode (FIG. 10B). The mobile terminal 100 can set a different application and a different backup level of information associated with the application per mode. For instance, the mobile terminal 100 backs up information of a recent week in the private mode and is also able to back up information of a recent month or real-time information in the business mode. Of course, the backup level per mode is set by a user or can be randomly set by the controller 180.

In particular, in the business mode, if a counterpart terminal is not in the business mode or a working hour (or a holiday) currently in consideration of a status (e.g., a currently activated mode, a current location, a time zone, etc.) of the counterpart terminal, with which the mobile terminal 100 currently attempts to contact, the mobile terminal 100 informs a user of the unavailability of the counterpart terminal to enable the user to select whether to make a contact. In doing so, the mobile terminal 100 can receive information indicating the status of the counterpart terminal from the counterpart terminal or a company server and can then obtain the status of the counterpart terminal using the received information.

In the business mode, the mobile terminal 100 modify all previously-stored schedules to be fitted to a currently belonging time zone by reflecting a current time zone (for a case that a time zone is changed).

When there is no user input action made for a predetermined period of time in the business mode, the mobile terminal 100 lock or shut down the business mode automatically or in accordance with a user selection. In this instance, in order to unlock the locked state or cancel the shutdown, a user authentication information corresponding to the business mode is input or an authentication should be granted by the company server. Moreover, in the business mode, when an overseas roaming function is loaded on a user terminal, if a current location of a user is domestic, the overseas roaming function is automatically deactivated. If a current location of a user is overseas, the overseas roaming function can be automatically activated.

According to a fifth embodiment, when at least one common application is executed, each of a plurality of modes can vary its feature to correspond to a currently activated mode. In other words, when a specific application is a common application of a first mode and a second mode, the feature of the specific application can vary in accordance with whether the currently activated mode is the first mode or the second mode.

In this instance, a feature varying per mode can mean that a configuration (e.g., a corresponding content/data configuration included), display or security of an application is varied.

For instance, a feature varying per mode can mean that a structure (e.g., configuration of a corresponding menu item) of an application, an execution screen (e.g., background image, letter type, letter size, provided information, etc.) of an application, a configuration of content/data associated with an application (cf. FIG. 9A, FIG. 9B), an application function, a security of an application (or, content, data, etc.) or the like is different per mode. Of course, as the examples of the application features are just exemplary, any case of configuring a common application to be different per mode is applicable to the present embodiment.

For instance, when the application function is different, a photographing function is allowed to a camera in a private mode but may not be allowed in a business mode. In another instance, when an authority of access to an application is different, a phonebook provides a name, a phone number and a personal email address in a private mode and can further provide a company email address, a rank, a department and an approval authority information in a business mode.

This is explained in detail with reference to FIG. 10C as follows. For clarity and convenience of the following description, assume that a plurality of modes include a private mode and a business mode.

Figure 10C:
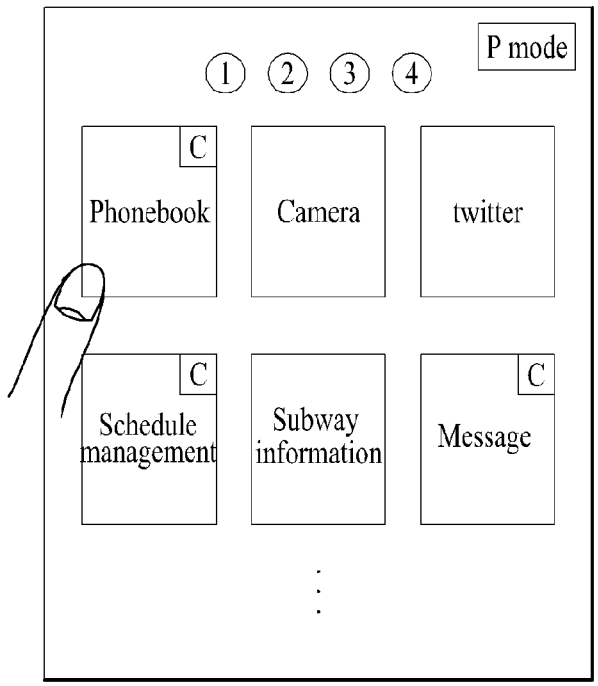
Figure 10C:
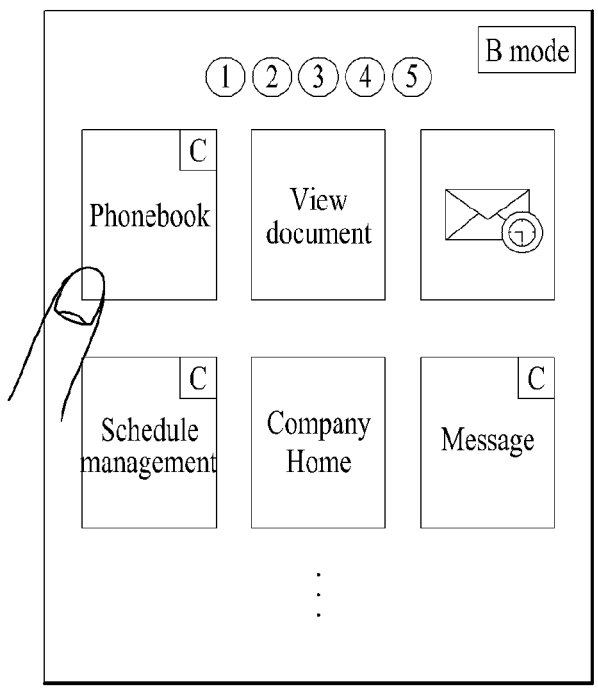

Referring to FIG. 10C, the mobile terminal 100 can receive an input of an execution command signal for executing a phonebook (i.e., an example of a common application) from a user.

The mobile terminal 100 determines a mode activated at the input timing point of the execution command signal. If a private mode is currently activated, the mobile terminal 100 executes the phonebook in accordance with a feature corresponding to the private mode and then displays an execution screen of the phonebook (cf. FIG. 6A or FIG. 9A (a)). On the contrary, if a business mode is activated, the mobile terminal 100 executes the phonebook in accordance with a feature corresponding to the business mode and then displays an execution screen of the phonebook (cf. FIG. 6B or FIG. 9A (b)).

For instance, a case that a security of an application is different is explained as follows. First of all, when attempting to execute a common application in a first mode, an authentication procedure is not requested or a low-level security set authentication information needs to be input. Yet, when attempting to execute a common application in a second mode, an authentication procedure is requested or a high-level security set authentication information should be input. In doing so, the application execution can include an output of content or data associated with the application as well as an execution screen display of the application.

According to a sixth embodiment, a plurality of modes can be discriminated from each other using user information corresponding to the modes, respectively. In this instance, the user information can include a user name (or title), a user image, a user phone number, a user email address, a user blog address and the like.

For instance, first and second user information different from each other can be set for first and second modes, respectively. In particular, when a first phone number and a second phone number (e.g., dual SIM) are assigned to the mobile terminal 100, the first phone number and the second phone number can be set for the first mode and the second mode, respectively.

In the above description, the definitions of the modes mentioned in the disclosure are explained. In addition, when a plurality of modes exist, the method of discriminating a plurality of the modes is explained as well.

According to a seventh embodiment, each of a plurality of modes can be discriminated by an application group including at least one application executed in the corresponding mode.

For instance, when at least one application is executable in each of a plurality of modes, the controller 180 can configure an application group including executable application(s) per mode. Moreover, the application group can be configured in accordance with an application type as well as the corresponding mode. For example, if an application type is a call, call related applications are included in the corresponding application group. If an application type is a camera, camera related applications can be included in the corresponding application group.

Moreover, the mobile terminal 100 displays a per-mode group identifier corresponding to a per-mode application group on the screen. If a specific group identifier is selected, the mobile terminal 100 can display indicators of applications belonging to the corresponding application group or can switch a current mode to a mode corresponding to the specific group identifier (assuming that it is not a currently activated mode).

In the following description, a mobile terminal, which is capable of offering an application execution history of a deactivated mode as well as an application execution history of a currently activated mode in an activated state of a prescribed one of a plurality of modes, and display controlling method therein are described with reference to the accompanying drawings.

Figure 11:
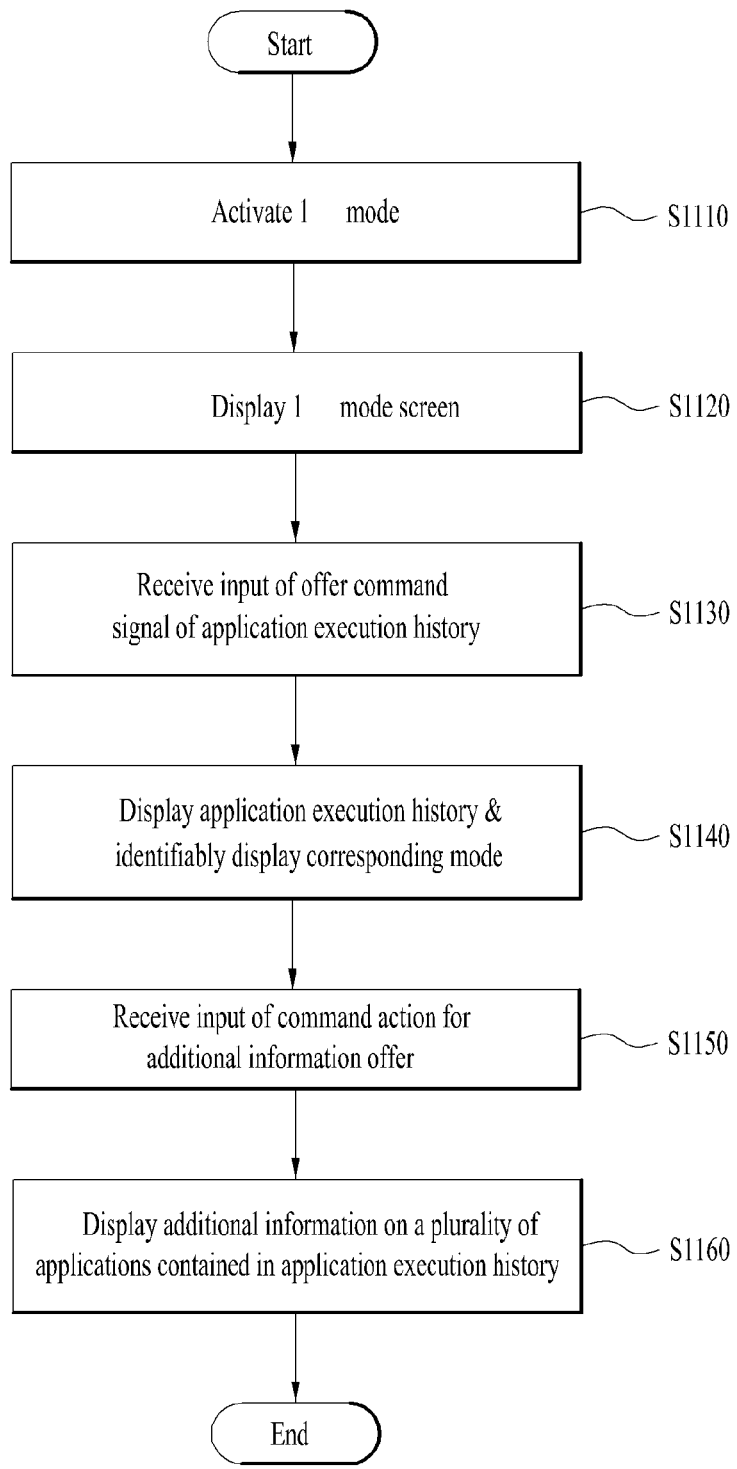
FIG. 11 is a flowchart for a display controlling method in a mobile terminal according to one embodiment of the present invention.

FIG. 11 is a flowchart of a display controlling method in a mobile terminal according to one embodiment of the present invention. For clarity and convenience of the following description, a plurality of modes are limited to a $1^{st}$ mode and a $2^{nd}$ mode. An application executable in both of the $1^{st}$ mode and the $2^{nd}$ mode shall be named a common application. In addition, an application executable in either the $1^{st}$ mode or the $2^{nd}$ mode shall be named a dedicated application. For instance, a dedicated application of a $1^{st}$ mode is named a $1^{st}$ dedicated application and a dedicated application of a $2^{nd}$ mode can be named a $2^{nd}$ dedicated application.

An application execution history mentioned in the present specification is an execution history information on each of a plurality of application executed for a predetermined time in the mobile terminal 100 and can include at least one of execution period information, execution start/end hour information, information on an executed mode, information on data (or content) used for execution, information on an execution screen displayed last in execution and the like for example.

For instance, in an application execution history, applications executed for a predetermined time can be sequentially listed with reference to execution start hour (or execution end hour). In this instance, the application execution history can be represented as at least one of a bar type, a list type, a clock type and the like, by which the present invention is non-limited.

Referring to FIG. 11, while a $1^{st}$ mode and a $2^{nd}$ mode are implemented, the mobile terminal 100 activates the $1^{st}$ mode under the control of the controller 180 (S1110).

In doing so, if an operating system is designated per mode, the controller 180 can implement the $1^{st}$ mode and the $2^{nd}$ mode using a first individual operating system and a second individual operating system (i.e., a first OS and a second OS in multi-OS) corresponding to the $1^{st}$ mode and the $2^{nd}$ mode, respectively. If an operating system per mode is common, the controller 180 can implement the $1^{st}$ mode and the $2^{nd}$ mode using a common operating system (i.e., a single OS).

In the $1^{st}$ mode activating step S1110, the mobile terminal 100 can execute a common application or a dedicated application in accordance with a feature corresponding to the $1^{st}$ mode. For instance, when the $1^{st}$ mode and the application are a private mode and a phonebook, respectively, the mobile terminal 100 can display a contact information list including contact information associated with the private mode or a specific contact information including a data field corresponding to the private mode.

In the following description, a mode implemented in case of OS booting per multi-Os type (cf. FIGS. 4A to 4C) is explained. For instance, multi-OS types can include a first multi-OS type (e.g., Guest OS 1 and Guest OS 2 included: This type corresponds to a first scheme) and a second multi-OS type (e.g., Host OS and Guest OS: This type corresponds to a second scheme.). Assume that Guest OS 1 and Host OS correspond to a private mode. In addition, assume that Guest OS 2 and Guest OS correspond to a business mode.

First of all, according to the first multi-OS type, if the hypervisor included in the controller 180 is driven, the mobile terminal 100 can boot Guest OS 1 and Guest OS 2 simultaneously or sequentially. If a specific one of a private mode and a business mode is selected by a user or the controller 180, the mobile terminal 100 activates the specific mode on the Guest OS corresponding to the selected specific mode and can then execute a corresponding application in the activated specific mode. Meanwhile, when the specific mode selecting step is omitted, the mobile terminal 100 can activate the private mode using the Guest OS 1 designated as default.

According to the second multi-OS type, the mobile terminal 100 preferentially boots the Host OS corresponding to the private mode and can then preload the Guest OS corresponding to the business mode, under the control of the controller 180. The mobile terminal 100 activates the private mode on the Host OS and can then execute the application in the private mode.

Moreover, when the Guest OS preloaded by the hypervisor is booted, the mobile terminal 100 activates the business mode on the Guest OS and can then execute the corresponding application in the business mode. Meanwhile, when post-loading the Guest OS, if the hypervisor is driven to load the Guest OS, the mobile terminal 100 can post-load the Guest OS.

In doing so, when preloading the Guest OS, an initial OS booting takes a considerable time. Yet, since two operating systems are already booted after completion of the booting, a mode switching can be quickly performed. When post-loading the Guest OS, an initial OS booting is quickly performed. Yet, when switching a current mode to a mode corresponding to the Guest OS, it may take a considerable time for a mode switching due to the time consumption attributed to the Guest OS booting.

The Guest OS loading process is described in detail as follows. First of all, the mobile terminal 100 downloads an application corresponding to the Guest OS from a server for managing and providing applications, executes the downloaded application, and can then load the Guest OS. Subsequently, as the loaded Guest OS is booted, the mobile terminal 100 can activate the business mode corresponding to the Guest OS.

Referring now to FIG. 11, in the activating step S1110, the mobile terminal 100 can activate either the $1^{st}$ mode or the $2^{nd}$ mode in accordance with a user selection or a prescribed reference in case of an operating system booting, under the control of the controller 180. The activation of the $1^{st}$ mode described in the activating step S1110 is just one example of the selective activation and does not mean that the $1^{st}$ mode is preferentially activated.

For instance, in case of the single OS, any one of the $1^{st}$ and $2^{nd}$ modes can be activated in accordance with the single OS booting. In another instance, in case of the multi-OS, a mode selected by a user from the $1^{st}$ mode and the $2^{nd}$ mode or a firstly OS-booting completed one of the $1^{st}$ mode and the $2^{nd}$ mode is activated in accordance with the booting of the multi-OS. In particular, in case of the sequential booting of the multi-OS, the mobile terminal 100 can preferentially boot the OS, which meets a prescribed condition, under the control of the controller 180. For instance, the controller 180 can preferentially boot the OS that meets one of the conditions such as an OS having a preferential booting order, an OS designated by a user to be preferentially booted and an OS supporting a mode corresponding to a current terminal status.

Under the control of the controller 180, if the $1^{st}$ mode is activated, the mobile terminal 100 displays a screen (hereinafter named a $1^{st}$ mode screen) of the $1^{st}$ mode using the display unit 151 (S1120).

In this instance, the $1^{st}$ mode screen can include at least one of an execution screen of an application executed in the $1^{st}$ mode, a screen (e.g., a home screen, a menu screen, etc.) containing indicators of applications executable in the $1^{st}$ mode, a screen containing a widget executed in the $1^{st}$ mode, a configuration setting screen for setting an execution configuration of the $1^{st}$ mode and the like, by which the present invention is non-limited. In addition, any screen displayed in a $1^{st}$ mode activated state can be called a $1^{st}$ mode screen. Specifically, when the $1^{st}$ mode screen consists of a plurality of pages, the $1^{st}$ mode screen displayed in the displaying step S1120 can include a specific one of a plurality of the pages.

The mobile terminal 100 receives an input of an application execution history providing command signal from a user via the user input unit 130 (S1130). In this instance, if the display unit 151 includes a touchscreen, the application execution history providing command signal can be input by a touch action on the touchscreen.

For instance, the application execution history providing command signal can be input by one of a selection action on a corresponding menu item/key/key zone, an input of a corresponding terminal motion, an input of a corresponding voice and the like.

In addition, the application execution history providing command signal can be input for a currently activated mode & a currently deactivated mode or a currently activated mode & a deactivated mode and can have a different input form or pattern.

In the following description, an application execution history providing signal for a currently activated $1^{st}$ mode and a deactivated $2^{nd}$ mode is input. Before the description of an application execution history display, generation of an application execution history is described as follows.

First of all, when executing an application in an activated state of either a $1^{st}$ mode or a $2^{nd}$ mode, the mobile terminal 100 can save an execution related information of the executed application in the memory 160 or in an external server (or an external storage medium), under the control of the controller 180.

For instance, the execution related information of the application can contain an application executed modem an application executed period (including execution start hour and execution end hour), an execution screen last displayed in case of an application execution, information (e.g., name, use order, use time, etc.) on data or content used for an application execution and the like.

The mobile terminal 100 can generate an application execution history using the stored execution related information of the application and can then save the generated application execution history in the memory 160 or the external server, under the control of the controller 180.

For instance, the mobile terminal 100 generate the application execution history with reference to an application executed mode, an application belonging category, an application executed period or the like.

When receiving an input of an application execution history providing command signal, the mobile terminal 100 displays an application execution history of the $1^{st}$ and $2^{nd}$ modes on a prescribed region of the $1^{st}$ mode screen using the display unit 151, under the control of the controller 180 (S1140).

In particular, in the displaying step S1140, the controller 180 can identifiably display whether the application execution history corresponds to the $1^{st}$ mode or the $2^{nd}$ mode. That is, the controller 180 can identifiably display that each of a plurality of the applications (e.g., the applications used to be executed in the $1^{st}$ or $2^{nd}$ mode for a predetermined period) contained in the application execution history is executed in or corresponds to a prescribed mode. When a common application is contained in the application execution history, if the common application is executed in both of the $1^{st}$ mode and the $2^{nd}$ mode, a display of the common application executed in the $1^{st}$ mode can differ from a display of the common application executed in the $2^{nd}$ mode on the application execution history executed in the $1^{st}$ mode.

Moreover, in the displaying step S1140, the controller 180 can identifiably display whether each of a plurality of the applications contained in the application execution history is a dedicated application or a common application.

In the displaying step S1140, under the control of the controller 180, the mobile terminal 100 can display an information on each of a plurality of the applications contained in the application execution history on the application execution history.

For instance, the application information displayed on the application execution history can include an application name (or title), a representative application image, an execution screen displayed last in case of an application execution, application execution hour information and the like, which are just exemplary. In addition, various information can be further included in the application information.

In the displaying step S1140, under the control of the controller 180, the mobile terminal 100 consequentially enumerates a plurality of the applications contained in the application execution history with reference to application execution hours (e.g., execution start hours, execution end hours, etc.). For instance, a plurality of the applications contained in the application execution history can be listed in order of an early start hour or a recent execution start hour.

In the displaying step S1140, a position, size, color and/or the like of a region for displaying the application execution history can be adjusted in accordance with a user selection of a decision made by the controller 180. In addition, the region for displaying the application execution history can be provided to a prescribed one (e.g., a position fixed stationary region, a position variable region, etc.) of a plurality of partial regions generated through screen partitioning, a popup window, an overlay window, or a transparent screen overlaid over the $1^{st}$ mode screen.

In the displaying step S1140, under the control of the controller 180, the mobile terminal 100 consort and display the application execution history with reference to at least one of an application executed mode, an application executed period and an application belonging category. Hence, the mobile terminal 100 generate a plurality of application execution histories in accordance with the reference. In particular, a plurality of the generated application execution histories can be displayed at the same time or at least one of a plurality of the generated application execution histories can be selected and displayed.

For instance, if the application executed modes are $1^{st}$ mode and $2^{nd}$ mode, the corresponding application execution histories can be displayed in a manner of being sorted into an application execution history of the $1^{st}$ mode and an application execution history of the $2^{nd}$ mode. In another instance, the corresponding application execution histories can be displayed in accordance with the application executed period in a manner of being sorted into an application execution history containing applications executed today (or on specific date designated by a user), an application execution history containing applications recently executed for a week, and an application execution history containing applications executed during a user designated period. For another instance, with reference to the application belonging category, assuming that the categories include interne, TV, camera and schedule management, the corresponding application execution histories can be displayed in a manner of being sorted into an application execution history containing applications belonging to the category 'internet', an application execution history containing applications belong to the category 'TV', an application execution history containing applications belonging to the category 'camera', and an application execution history containing applications belonging to the category 'schedule management'.

Under the control of the controller 180, the mobile terminal 100 sets a display configuration of an application execution history and can display the application execution history to correspond to the set display configuration. In this instance, the display configuration of the application execution history can be set by a user selection or can follow a display configuration set as a default in the mobile terminal 100.

In the following description, an application execution history displaying process is explained in detail with reference to the accompanying drawings. For clarity and convenience of the following description, assume that a $1^{st}$ mode and a $2^{nd}$ mode are a private mode (P) and a business mode (B), respectively. In addition, assume that the private mode is currently activated.

Figure 12C:
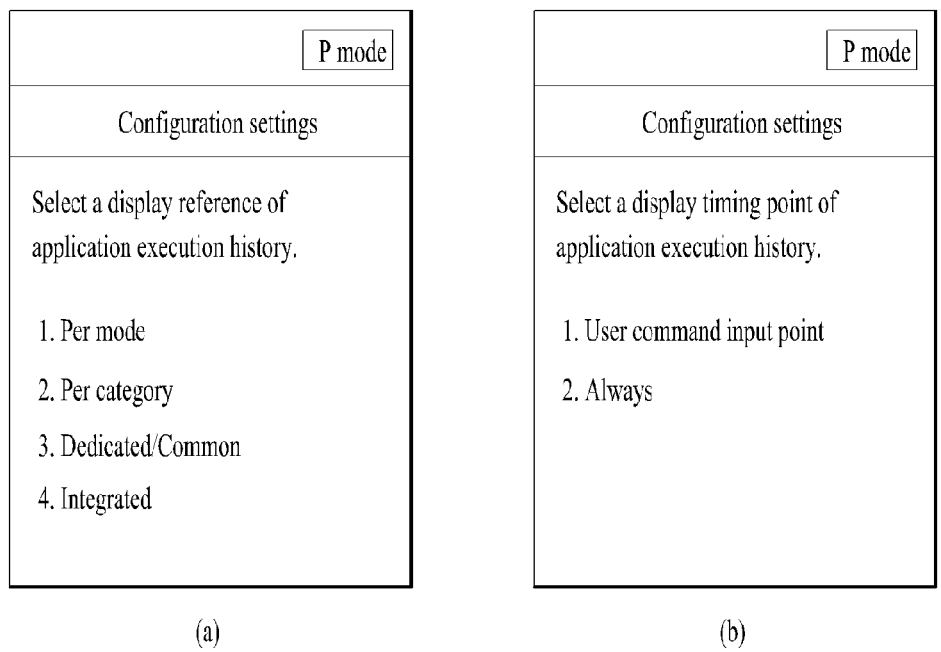

FIGS. 12A to 12C are diagrams for setting a configuration of an application execution history display according to the present invention.

Referring to FIG. 12A, the mobile terminal 100 can receive a selection of at least one application to be contained in an application execution history from a plurality of applications executed in a $1^{st}$ mode from a user (FIG. 12A (a)). In addition, the mobile terminal 100 can receive a selection of at least one application to be contained in an application execution history from a plurality of applications executed in a $2^{nd}$ mode from a user (FIG. 12A (b)). Hence, even if a specific application, which is not selected in the application selecting process, is executed, the mobile terminal 100 does not have the specific application contained in the application execution history.

Optionally, the application selecting process shown in FIG. 12A may not be performed. If so, all applications executed in the $1^{st}$ and $2^{nd}$ modes can be included in the application execution history if they are executed.

Referring to FIG. 12B, the mobile terminal 100 can set a display type of an application execution history in accordance with a user selection (FIG. 12A (a)). In addition, the mobile terminal 100 can set a display period of an application execution history in accordance with a user selection (FIG. 12A (b)).

For instance, the available display type can include a bar type, a list type, a clock type and the like. This shall be described in detail later. In another instance, the available display period can include one of a day, a week, a user-designated period and the like. In particular, as the application execution history is displayed by a unit of the set display period, if the display period is set to a day, the application execution history can be provided by a day unit.

Referring to FIG. 12C, under the control of the controller 180, the mobile terminal 100 can set a display reference of an application execution history in accordance with a user selection (FIG. 12C (a)). In addition, under the control of the controller 180, the mobile terminal 100 can set a display timing point of an application execution history in accordance with a user selection (FIG. 12C (b)).

For instance, the display reference can include one of a per-mode display, a per-category display, a display per dedicated/common, an integrated display and the like. In particular, the per-mode display means that an application execution history is displayed by being sorted per mode. The per-category display means that an application execution history is displayed by being sorted per category to which an application belongs. The display per dedicated/common means that an application execution history containing dedicated applications and an application execution history containing common applications are separately displayed. In addition, the integrated display means that an application execution history containing all applications executed irrespective of mode/category/dedicated/common is displayed.

For instance, the display timing point can include one of 'user command input timing point' or 'always'. In particular, the 'user command input timing point' means that an application execution history is displayed when a user inputs an application execution history providing command signal. In addition, the 'always' means that an application execution history is always displayed in a mode screen display state. Occasionally, even if the 'always' is set, an application execution history may not be displayed in an application executed state.

Besides, the display type, the display period, the display reference or the display timing point can be set to differ per mode.

Figure 13A:
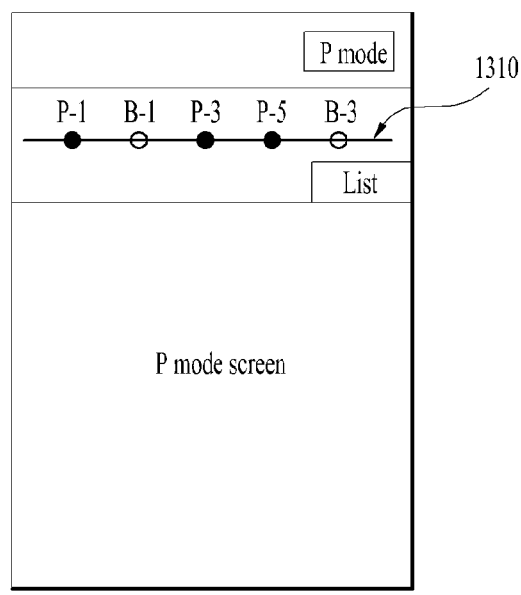
FIGS. 13A to 13C are diagrams for displaying an application execution history in accordance with various display types according to the present invention.
Figures 13B, 13C:
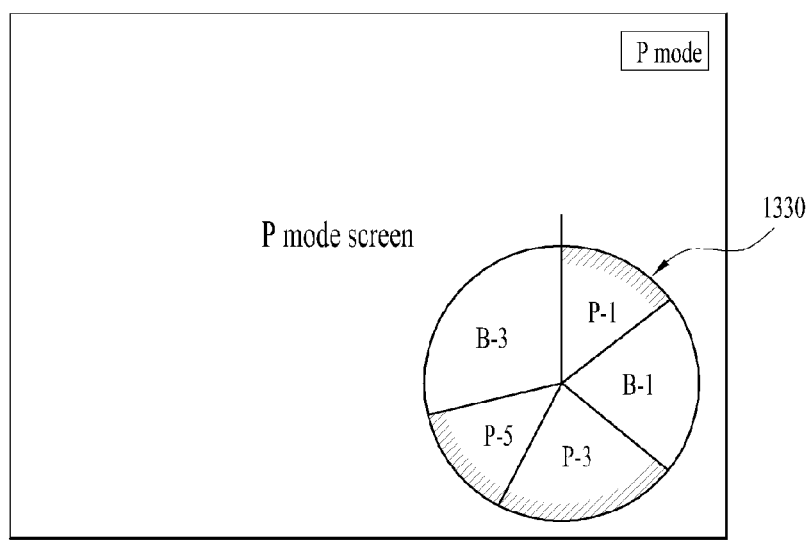

FIGS. 13A to 13C are diagrams for displaying an application execution history in accordance with various display types according to the present invention. In addition, the display type setting is already described with reference to FIG. 12B (a).

Referring to FIG. 13A, the mobile terminal 100 can display an application execution history 1310 of a bar type. For instance, identifiers of applications can be sequentially displayed in order of an early execution hour (or a recent execution hour) in the bar type application execution history.

Moreover, a corresponding identifier can be identifiably displayed in accordance with an application executed mode. In particular, an identifier of an application executed in a currently activated mode can be displayed further identifiably.

Referring to FIG. 13B, the mobile terminal 100 can display an application execution history 1320 of a list type. For instance, the list type application execution history contains a plurality of applications listed in order of a recent execution hour and can display such information on the applications as application names (P-1, B-1, P-3 . . . ), executed modes (private mode P, business mode B), execution hour information and the like.

Referring to FIG. 13C, the mobile terminal 100 can display an application execution history of a clock type. For instance, a clock diagram is divided into a plurality of regions and a plurality of applications contained in the application execution history can be displayed on a plurality of the regions, respectively. In this instance, the applications can be arranged clockwise in order of an early execution hour. Moreover, a size of the application situated region can be increased in proportion to an execution hour of the corresponding application. In addition, the corresponding region can be differently displayed in accordance with an application executed mode.

Next, FIGS. 14A to 14F are diagrams for displaying an application execution history in accordance with various display references according to the present invention. The display reference setting is already described with reference to FIG. 12C (a). For clarity and convenience, the following description is limited to an application execution history of a bar type.

Figure 14A:
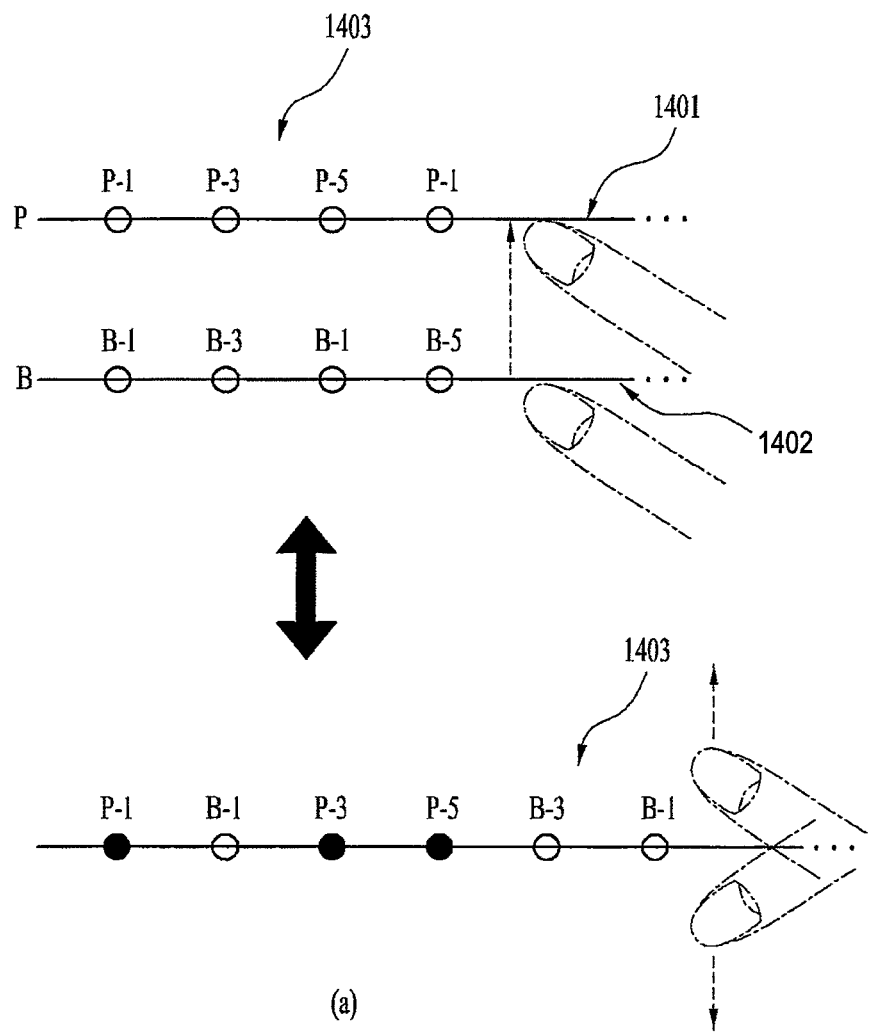
FIGS. 14A to 14F are diagrams for displaying an application execution history in accordance with various display references according to the present invention.
Figure 14A:
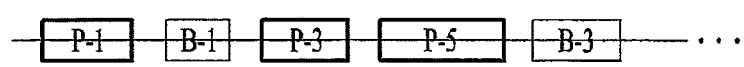

Referring to FIG. 14A (a), the mobile terminal 100 can display an application execution history (hereinafter named an integrated history 1403) corresponding to a private mode and a business mode (display reference: 'integrated'). In addition, the mobile terminal can display an application execution history (hereinafter named a private history 1401) corresponding to a private mode and an application execution history (hereinafter named a business history 1402) corresponding to a business mode (display reference: 'per mode'). As mentioned in the foregoing description, identifiers contained in an application execution history can be enumerated in order of an early execution hour or a recent execution hour of each of the applications indicated by the identifiers.

In particular, in the integrated history 1403, the identifiers P-1, P-3 and P-5 of the applications executed in the private mode and the identifiers B-1 and B-3 of the applications executed in the business mode can be differently displayed in accordance with their corresponding modes. For instance, the identifiers of the application executed in the private mode are represented as black, while the identifiers executed in the business mode are represented as white. In another instance, the identifiers of the applications executed in a currently activated private mode are displayed thick, while the identifiers of the applications executed in a currently deactivated business mode are display thin.

In the private history 1401, the identifiers P-1, P-3 and P-5 of the applications executed in the private mode are contained only. In addition, the identifiers B-1, B-3 and B-5 of the applications executed in the business mode are contained in the business history 1402 only.

When receiving a command action (e.g., a pinch-out action) for a switching to the per-mode display in a display state of the integrated history 1403, the mobile terminal 100 displays both of the private history 1401 and the business history 1402 or can display either the private history 1401 or the business history 1402.

When receiving an input of a command action (e.g., a pinch-in action, a touch & drag action to the private history 1401 and from the business history 1402, etc.) for a switching to the integrated display in a state of displaying at least one of the private history 1401 and the business history 1402, the mobile terminal 100 can display the integrated history 1403.

Moreover, the mobile terminal 100 is provided with a toggle key for a display switching of an application execution history and can then selectively display one of the integrated history 1403, the private history 1401 and the business history 1402.

Referring to FIG. 14A (b), in displaying identifiers on an application execution history, the mobile terminal 100 can adjust a size of each of the identifiers in proportion to an execution time of the corresponding application. For instance, the more the execution time increases, the larger the size becomes. An identifier of an application having an execution time of 10 minutes can have a size twice larger than that of an identifier of an application having an execution time of 5 minutes.

Figure 14B:
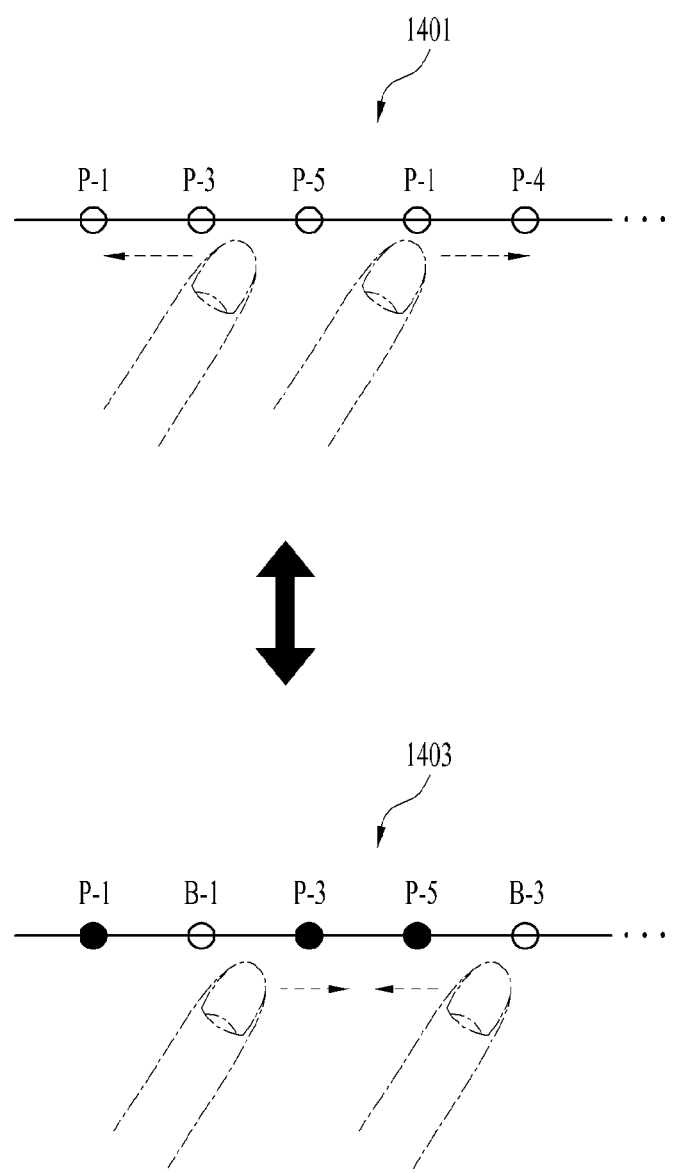

Referring to FIG. 14B, the mobile terminal 100 can display a private history 14001 corresponding to a currently activated private mode as a default. When receiving an input of a pinch-out action (i.e., example of a command action for switching to an integrated display) on the private history 1401 in a horizontal direction, the mobile terminal 100 can display an integrated history 1403. When receiving an input of a pinch-in action (i.e., example of a command action for switching to a private history display) on an integrated history 1403 in a horizontal direction, the mobile terminal 100 can display the private history 1401.

Moreover, even if the private history 1401 is displayed as a default, the mobile terminal 100 can switch the default to a display state of a business history using the toggle key and the like.

Figure 14C:
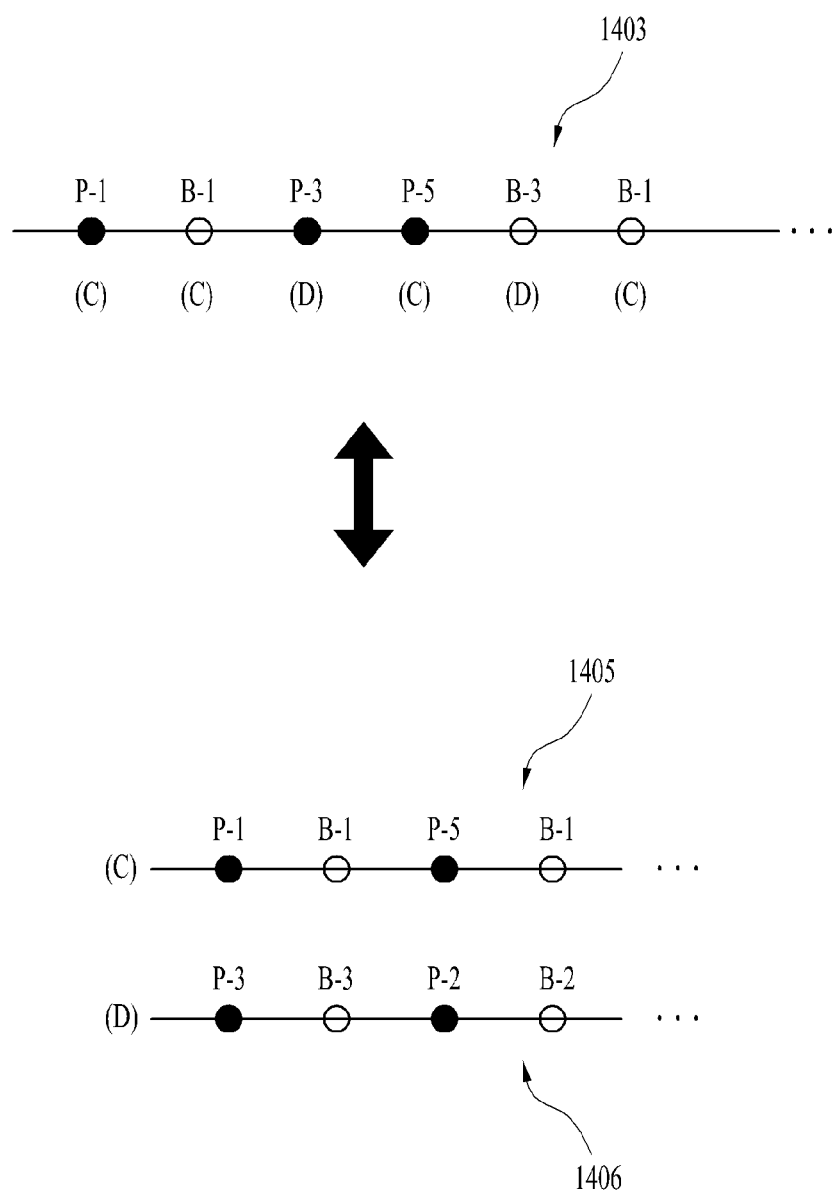

Referring to FIG. 14C, the mobile terminal 100 can indicate whether an application indicated by each identifier displayed on an integrate history 1403 is a common application (C) or a dedicated application (D).

Moreover, when receiving an input of a command action on the integrated history 1403 for a switching to a display per common/dedicated from a user, the mobile terminal 100 can display at least one of an application execution history (hereinafter named a common history) 1405 containing common applications and an application execution history (hereinafter named a dedicated history) 1406 containing dedicated applications. When receiving an input of a command action for a witching to an integrated display from a user in a display state of the common history 1405 and the dedicated history 1406, the mobile terminal 100 can display the integrated history 1403.

Optionally, the mobile terminal 100 is provided with a toggle key for a display switching of an application execution history and can then selectively display one of the integrated history 1403, the common history 1405 and the dedicated history 1406.

Figure 14D:
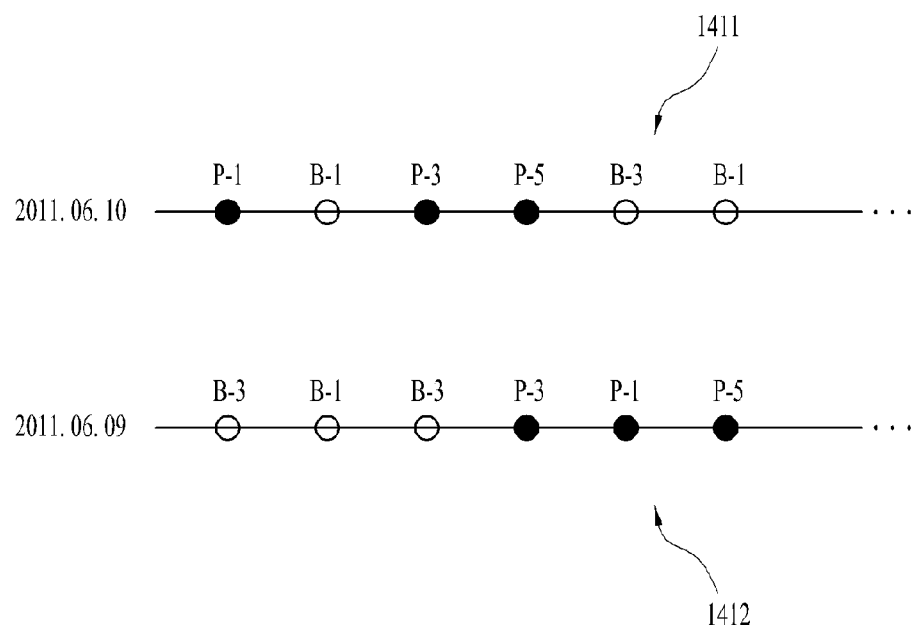

Referring to FIG. 14D, the mobile terminal 100 can display application execution histories 1411 and 1412 per date. In particular, the mobile terminal 100 displays an application execution history on today as a default and can display an application execution history on a specific date in accordance with a user selection.

Figure 14E:
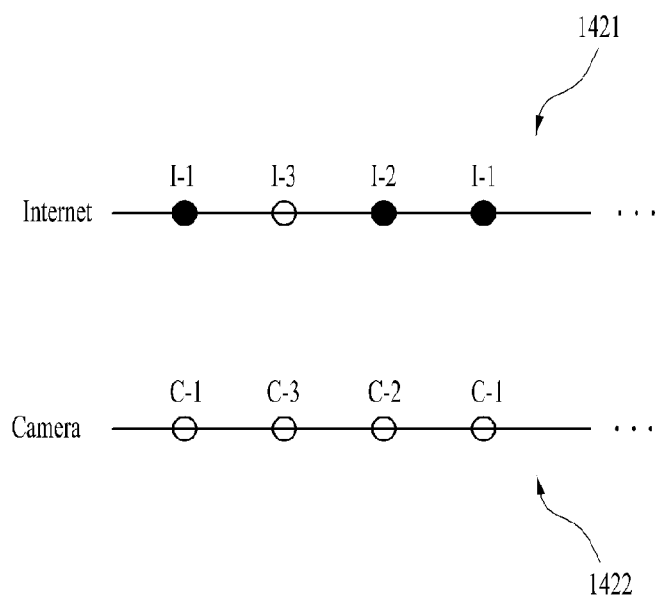

Referring to FIG. 14E, the mobile terminal 100 can display application execution histories 1421 and 1422 per application belonging category.

Figure 14F:
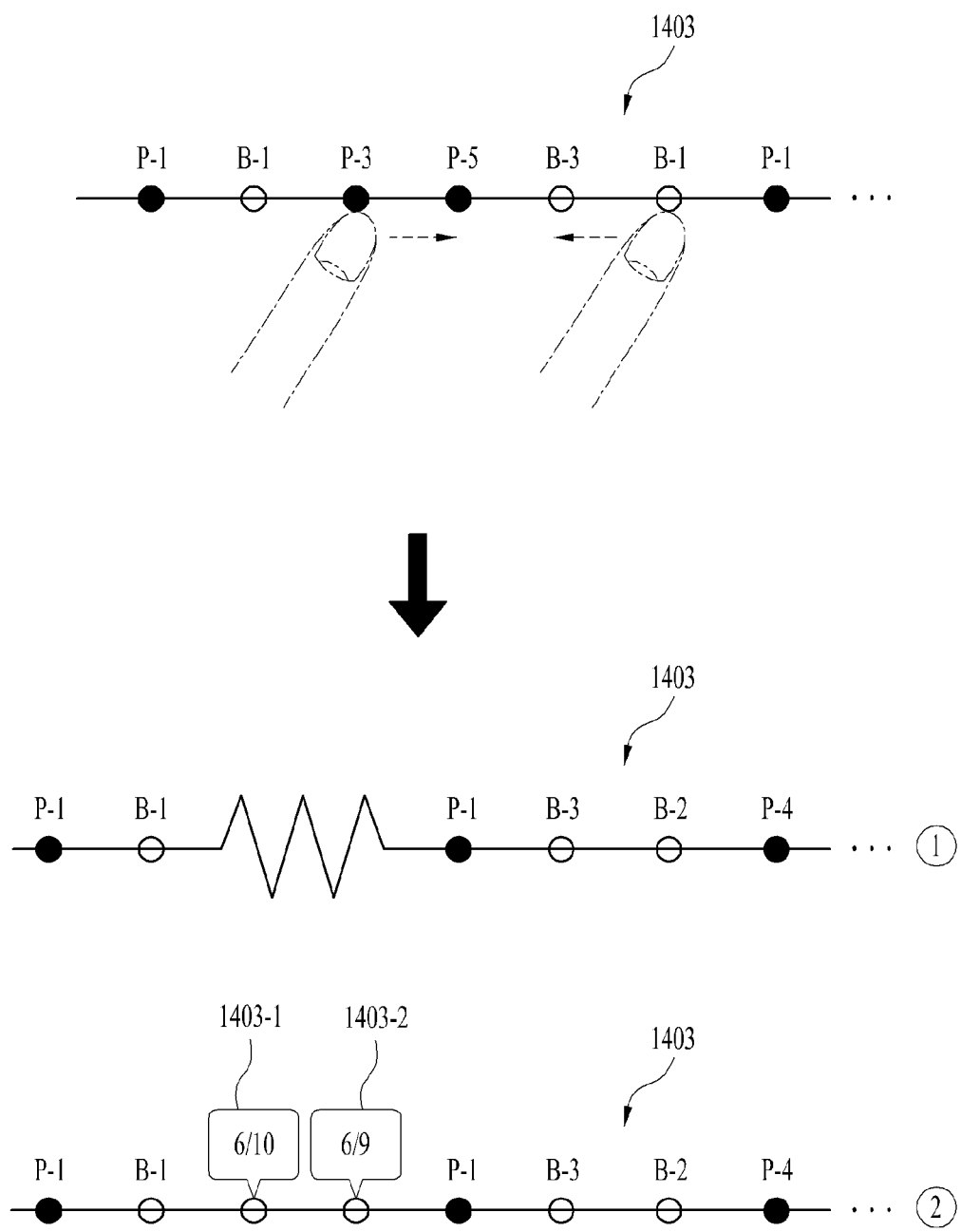

Referring to FIG. 14F, when receiving an input of a prescribed command action on an application execution history 1403, under the control of the controller 180, the mobile terminal 100 may not display at least one application, which corresponds to a partial section among a plurality of applications contained in the application execution history 1403, on the application execution history 1403.

In this instance, the input prescribed command action can include a command action for hiding (or not displaying) the at least one application corresponding to the partial section among a plurality of the applications contained in the application execution history.

In particular, when receiving an input of a pinch-in action from two random points P-3 and B-1 on the application execution history 1403 as the command action for hiding the partial section, the two random points and the identifiers P-3, P-5, B-3 and B-1 situated between the two random points may not be further displayed on the application execution history 1403 (♣). Of course, the identifier display omitted section can be identifiably displayed to indicate the corresponding omission. If a command action (e.g., a pinch-out action) for a review is input to the identifiably displayed section, the display omitted identifiers can be displayed again on the application execution history.

If the display omitted identifiers differ from each other in execution date, the execution dates 1403-1 and 1403-2 can be displayed on the application execution history 1403 (♦). Moreover, if a specific execution date is selected, the identifier of the application executed on the specific execution date can be displayed again on the application execution history 1403.

Figure 15A:
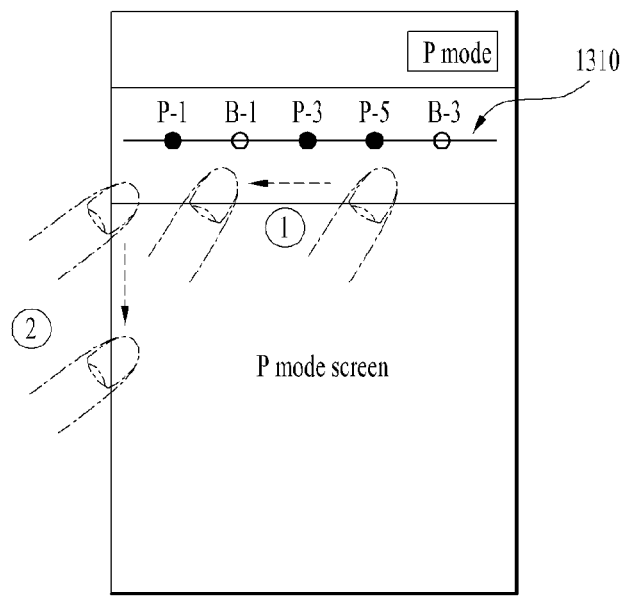
FIGS. 15A to 15C are diagrams for controlling an application execution history display state according to the present invention.
Figure 15B:
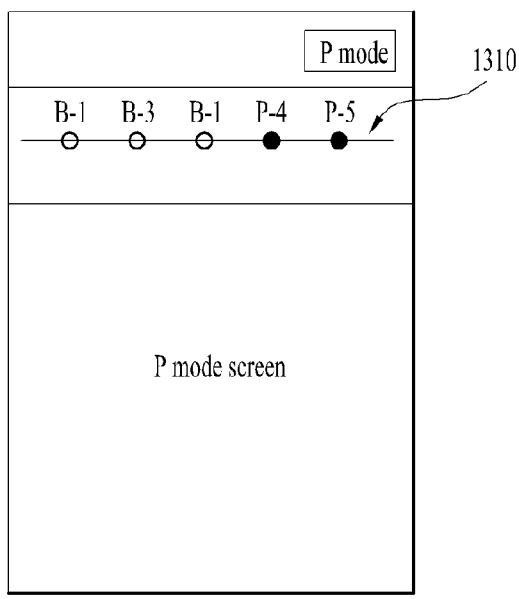
Figure 15C:
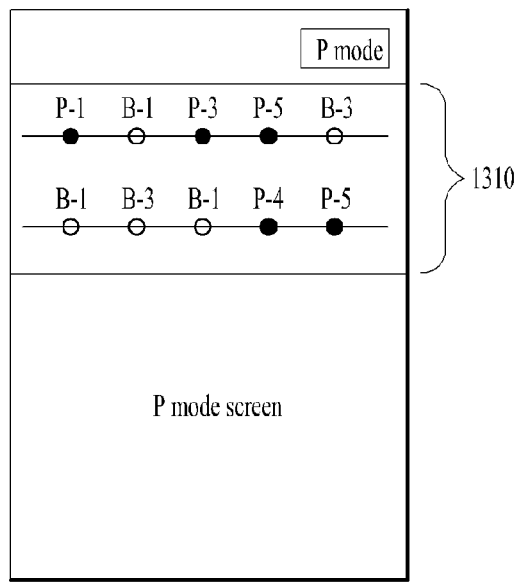

FIGS. 15A to 15C are diagrams for controlling an application execution history display state according to the present invention.

Referring to FIG. 15A and FIG. 15B, while a predetermined number of identifiers are displayed on an application execution history 1310 in order of an early execution hour of a corresponding application (FIG. 15A), when receiving an input of a touch action ♣ for scrolling the application execution history 1310 from a user, the mobile terminal 100 can scroll the application execution history 1310 and can then differentiate the identifier displayed on the application execution history 1310 as a result of the scroll. In this instance, a scroll distance or a scroll speed can vary in accordance with a distance or speed of the touch action or the like.

Referring to FIG. 15A and FIG. 15B, when receiving an input of a touch action ♦ for enlarging a region, on which an application execution history 1310 is displayed, from a user, the region for displaying the application execution history 1310 is enlarged and the number of applications contained in the application execution history 1310 can be incremented within the enlarged region.

For instance, the touch action for enlarging a region can include a touch & drag action from one point within the region to the other point outside the region. In addition, the number of the applications contained in the application execution history 1310 can be further incremented in proportion to an enlargement degree of the region.

Referring now to FIG. 11, under the control of the controller 180, the mobile terminal receives a prescribed command action on the application execution history displayed in the displaying step S1140 from a user via the user input unit 130 (S1150).

In particular, if the display unit 151 includes a touchscreen, the command action can include a touch action on the application execution history. In addition, the command action can include a command action for offering additional information on the application execution history.

In this instance, the additional information on the application execution history can include a representative image of each of a plurality of applications contained in an application execution history, an execution screen last displayed in case of a latest execution, a history of data (or content) used for a corresponding application execution and the like. Of course, as those examples correspond to one embodiment only, the additional information can further include various kinds of information.

The additional information offer can include an addition information offer (hereinafter called a total additional information offer) of all applications contained in an application execution history or an additional information offer (hereinafter called a specific additional information offer) of a specific application contained in an application execution history. Moreover, a command action for the total additional information offer and a command action for the specific additional information offer can differ from each other in input pattern.

If the input command action is a command action for an additional information offer, the mobile terminal 100 displays the additional information on a plurality of the applications contained in the application execution history using the display unit 151 under the control of the controller 180 (S1160). In this instance, the additional information may be displayed together with the application execution history or may not.

In particular, when receiving an input of a command action for a total additional information offer is input, the mobile terminal 100 can provide additional information on all applications contained in the application execution history. When receiving an input of a command action for a specific additional information offer, the mobile terminal 100 can provide additional information on a specific application only.

If a command action for a specific additional information offer is input to a specific application executed in a currently deactivated $2^{nd}$ mode, the mobile terminal 100 can limitedly display additional information on the specific application under the control of the controller 180. When receiving an input of a command action for a total additional information offer, the mobile terminal 100 can limitedly display additional information on an application executed in a currently deactivated $2^{nd}$ mode among all applications under the control of the controller 180.

For instance, if additional information is limitedly displayed, it can mean that such an information included in the information on a corresponding application as an information having a high security level, a conditional access set information, an information having a limited utilization in a different mode and a user-specific information is not displayed. In another instance, if additional information is limitedly displayed, it can mean that such an information included in the information on a corresponding application as an information having a security level not set, an information having a security level equal to or lower than a predetermined reference, an information having a utilization granted in a different mode and a user-specific information is displayed only.

In the following description, a process for providing additional information of an application execution history is explained in detail with reference to FIGS. 16A to 16D. For clarity and convenience of the following description, assume that a $1^{st}$ mode and a $2^{nd}$ mode include a private mode and a business mode, respectively. In addition, assume that the private mode is currently activated.

Figure 16A:
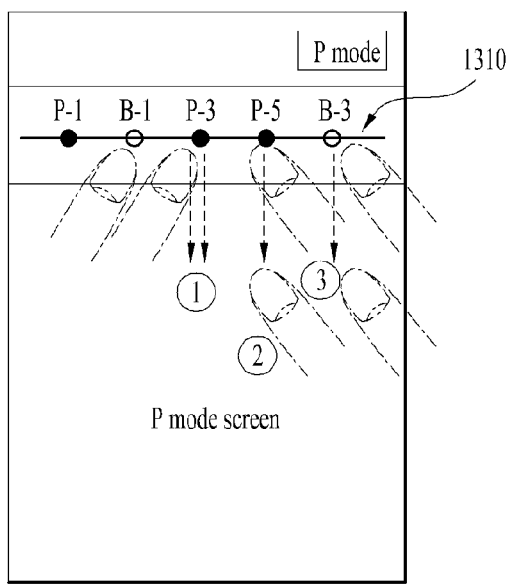
FIGS. 16A to 16D are diagrams for offering additional information of an application execution history according to the present invention.

Referring to FIG. 16A, the mobile terminal 100 can receive an input of a touch & drag action, which corresponds to a command action for an additional information offer, on an application execution history 1310.

Figure 16B:
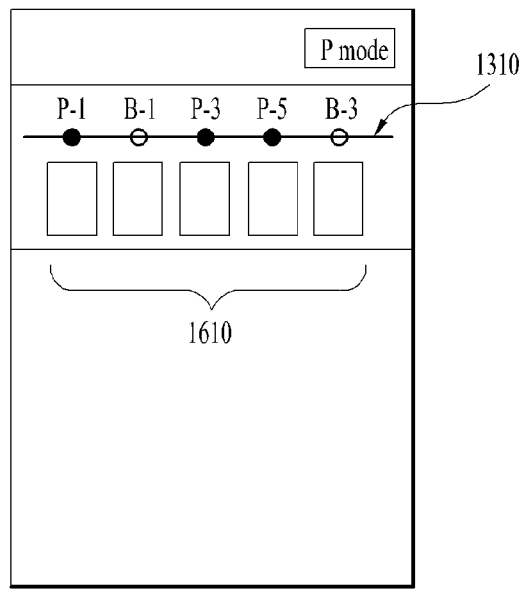

Referring to FIG. 16B, when receiving an input of a touch action ⓑ (e.g., a touch action by a multi-pointer from the application execution history 1310) corresponding to a total additional information offer in FIG. 16A, the mobile terminal 100 can display an execution screen 1610, which is last displayed when a latest execution of a corresponding application, as an additional information on each of all applications contained in the application execution history 1310.

Figure 16C:
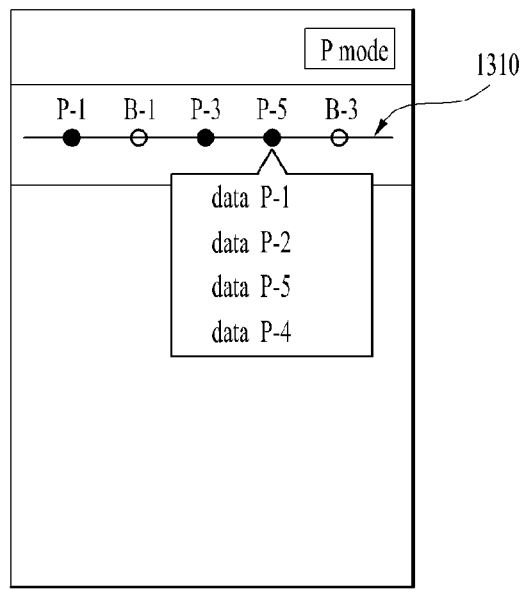

Referring to FIG. 16C, when receiving an input of a touch action ⓐ (e.g., a touch & drag action by a single pointer from an identifier P-5), which corresponds to a specific additional information offer, on the identifier P-5 of a specific application executed in the private mode (activated mode) in FIG. 16A, the mobile terminal 100 can display a list 1620 of data used for execution of the specific application as an additional information on the specific application.

Figure 16D:
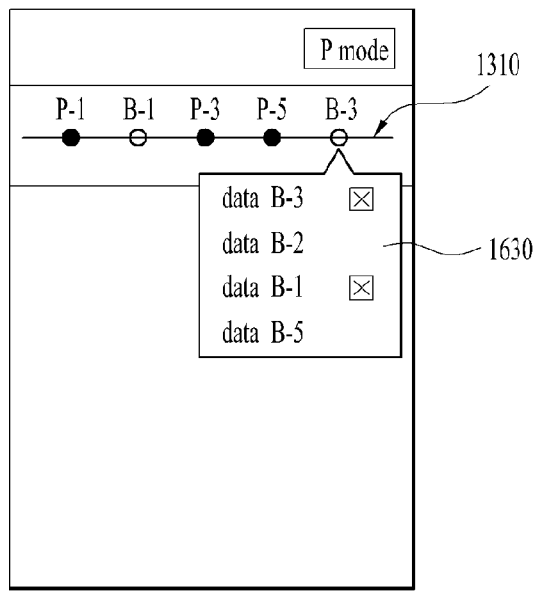

Referring to FIG. 16D, when receiving an input of a touch action ⓐ (e.g., a touch & drag action by a single pointer from an identifier B-3), which corresponds to a specific additional information offer, on the identifier B-3 of a specific application executed in the business mode (deactivated mode) in FIG. 16A, the mobile terminal 100 can display a list 1630 of data used for execution of the specific application as an additional information on the specific application. Moreover, the mobile terminal 100 enables conditional access set data not to be contained in the list or is also able to display that the conditional access set data is not accessible (X).

According to the present invention, when executing a specific application in a $1^{st}$ mode activated state, under the control of the controller 180, the mobile terminal 100 can display a data use history containing data used for a specific application execution. In addition, the embodiments applicable to the data use history among the aforesaid embodiments of the application execution history are modified to fit the data use history or can be identically applied to the data use history.

In this instance, the data use history can contain data used for a present or previous specific application execution. Moreover, if a generation period of the data use history is designated to a predetermined period of time, data used for the predetermined period of time from a current timing point can be contained in the data use history.

In the following description, a process for providing (or offering) a history of data used in executing a specific application during a specific application execution is explained in detail with reference to FIG. 17A and FIG. 17B.

Figure 17A:
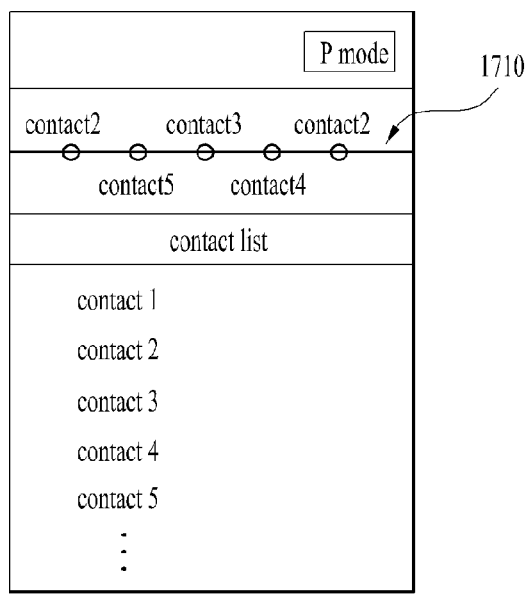
FIG. 17A and FIG. 17B are diagrams for offering a history of data used in executing a specific application during a specific application execution according to the present invention.
Figure 17B:
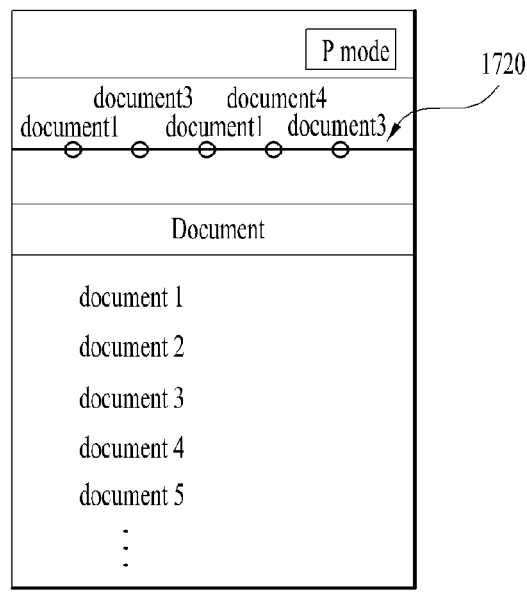

FIG. 17A and FIG. 17B are diagrams for offering a history of data used in executing a specific application during a specific application execution according to the present invention.

Referring to FIG. 17A, when executing a phonebook application, the mobile terminal 100 displays an execution screen of the phonebook application and is also able to display a contact information use history 1710 containing contact information used in executing the contact information use history 1710. In this instance, the contact information can be listed in the contact information use history 1710 with reference to a contact information used hour.

For instance, using the contact information for the phonebook application execution can include viewing/editing/saving of the contact information, call/message transmission and reception/email transmission and reception and the like.

Referring to FIG. 17B, when executing a document application, the mobile terminal 100 displays an execution screen of the document application and is also able to display a document use history 1720 containing documents used in executing the document use history 1720. In this instance, documents can be listed in the document use history 1720 with reference to a document used hour.

For instance, using the document for the document application execution can include viewing/editing/saving of the document and the like.

According to the present invention, the mobile terminal 100 receives an input of a selection action on a specific one of a plurality of applications contained in an application execution history via the user input unit 130 and can then execute the specific application under the control of the controller 180.

In particular, if a specific application corresponds to a currently activated $1^{st}$ mode, the mobile terminal 100 can execute the specific application while maintaining the $1^{st}$ mode activated state.

If a specific application corresponds to a currently deactivated $2^{nd}$ mode, the mobile terminal 100 switches the $1^{st}$ mode to the $2^{nd}$ mode. Hence, the $1^{st}$ mode is deactivated and the $2^{nd}$ mode is activated. Subsequently, in the second mode activated state, the mobile terminal 100 can execute the specific application.

If a specific application is a common application, the mobile terminal 100 executes the common application in a currently activated $1^{st}$ mode as a default (1) or can execute the common application in a user-selected one of the $1^{st}$ mode and the $2^{nd}$ mode (2). In this case (2), if the $2^{nd}$ mode is selected, a switching to the $2^{nd}$ mode is performed.

If a $3^{rd}$ mode needs to be entered by a switching to execute a specific application, under the control of the controller 180, the mobile terminal 100 requests a prescribed authentication procedure. If the authentication procedure is validly performed, the mobile terminal 100 enters the $2^{nd}$ mode and can then execute the specific application.

For instance, the controller 180 can request the authentication procedure in one of a case that a conditional access is set on the $2^{nd}$ mode to switch to, a case that a security level set on the $2^{nd}$ mode is higher than that set on the $1^{st}$ mode despite that a security level is set on each of the $1^{st}$ mode and the $2^{nd}$ mode, and a case that the $1^{st}$ mode and the $2^{nd}$ mode are the private mode and the business mode, respectively.

In particular, the authentication procedure receives an input of a user authentication information from a user and then determines whether the input user authentication information is valid. If the input user authentication information is valid, the authentication procedure can grant the switching to the $2^{nd}$ mode.

For instance, the user authentication information includes a user authentication information set dedicated to the $2^{nd}$ mode or a user authentication information necessary for the mode switching in common without being limited to the $2^{nd}$ mode. Moreover, the user authentication information can be set different in accordance with a conditional access level (or a security level) of the $2^{nd}$ mode. For instance, if the conditional access level is high, the user authentication information can be complicated. If the conditional access level is low, the user authentication information can be simple.

When the $2^{nd}$ mode is entered plural times, the controller 180 can request a user authentication information differing each entry. The controller 180 can receive an input of a user authentication information at a user-specific timing point of entering the $2^{nd}$ mode from a user.

After the authentication procedure for the switching to the 2nd mode has been successfully completed, the authentication procedure can be skipped when re-switching to the $2^{nd}$ mode later. For instance, the mobile terminal 100 skip the corresponding authentication procure when a re-switching for a predetermined period of time (e.g., duty hours, a day, a week, etc.), a re-switching for a period between terminal-on and terminal-off, and the like.

Moreover, under the control of the controller 180, if the authentication procedure is not validly performed, the mobile terminal 100 maintains the $1^{st}$ mode activated state or can provide basic information (e.g., information having no conditional access set thereon, information having a security level lower than a predetermined reference, etc.) in accordance with the specific application execution only.

In the following description, if a specific application contained in an application execution history is selected, a process for executing the specific application is explained in detail with reference to FIGS. 18A to 18D.

FIGS. 18A to 18D are diagrams for executing a specific application when selecting the specific application contained in an application execution history according to the present invention.

Figure 18A:
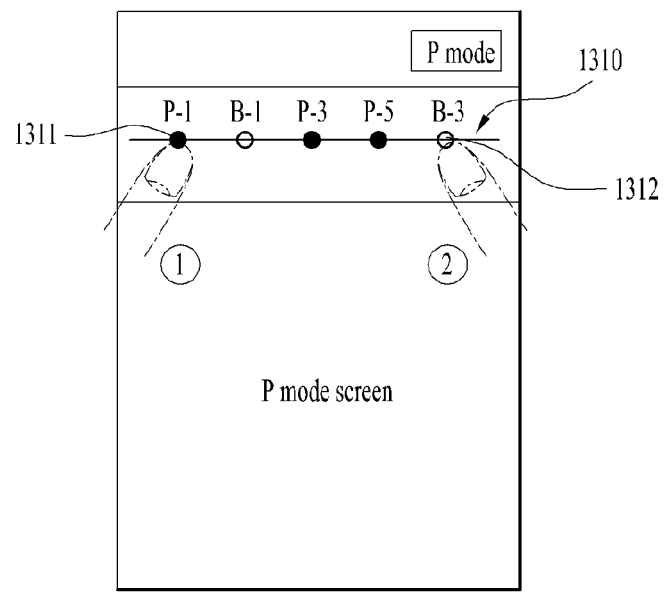
FIGS. 18A to 18D are diagrams for executing a specific application when selecting the specific application contained in an application execution history according to the present invention.
Figure 18B:
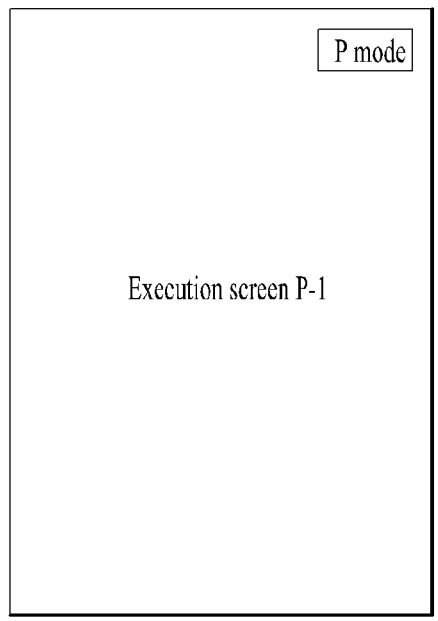

Referring to FIG. 18A and FIG. 18B, when receiving a selection of an identifier P-1 1311 of a specific application executed in a currently activated private mode among a plurality of identifiers contained in an application execution history 1310, the mobile terminal 100 can execute the specific application in a private mode activated state.

Figure 18C:
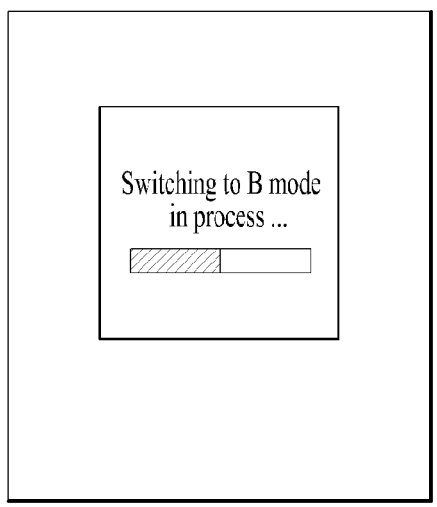
Figure 18C:
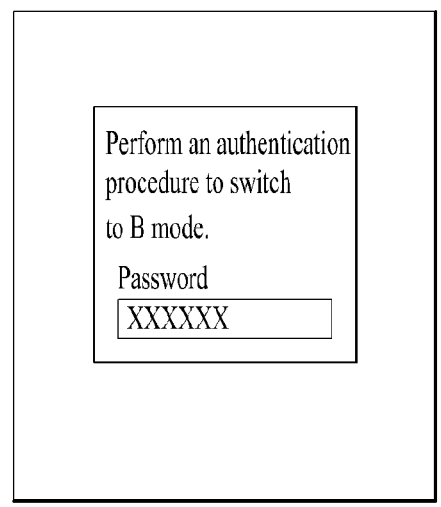

Referring to FIG. 18C, when receiving a selection of an identifier B-3 1312 of a specific application executed in a currently deactivated business mode in FIG. 18A, the mobile terminal can perform an operation of a switching to a business mode. In doing so, the mobile terminal 100 can directly enter the business mode without an authentication procedure (FIG. 18C (a)) or may be able to request the authentication procedure to be performed (FIG. 18C (b)).

For instance, in the course of the authentication procedure, a user can input such a user authentication information as a password, a user fingerprint, a user face image (necessary to turn on a camera module), a user voice, a specific touch pattern, a user iris recognition and the like. Hence, the mobile terminal 100 can determine whether the authentication procedure is valid in a manner of determining whether the input user authentication information matches a previously registered user authentication information.

Figure 18D:
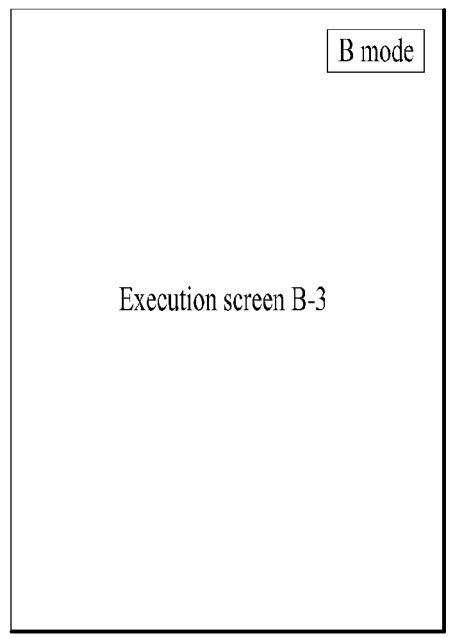

Referring to FIG. 18D, as the business mode is entered, the mobile terminal 100 activates the business mode and can then execute the specific application.

According to the present invention, while additional information on a plurality of applications contained in an application execution history is displayed, the mobile terminal 100 can receive a selection of the additional information on a specific application from a user. Alternatively, while additional information on a specific application is displayed, the mobile terminal 100 can receive a selection of specific additional information.

In addition, under the control of the controller 180, the mobile terminal can execute the specific application using the selected additional information. Moreover, if the specific application corresponds to a currently deactivated $2^{nd}$ mode, the mobile terminal 100 enters the $2^{nd}$ mode and is than able to execute the specific application in the $2^{nd}$ mode activated state (refer to the above description).

In the following description, a process for executing a specific application using additional information of the specific application is explained in detail with reference to FIGS. 19A to 20B.

For clarity and convenience of the following description, assume that a specific application corresponds to a currently deactivated business mode. In addition, assume that a separate authentication procedure is not requested for a mode switching. Of course, although an authentication procedure may be requested, details of the authentication procedure shall be omitted from the following description.

FIGS. 19A to 20B are diagrams for executing a specific application using additional information of the specific application contained in an application execution history according to the present invention.

Figure 19A:
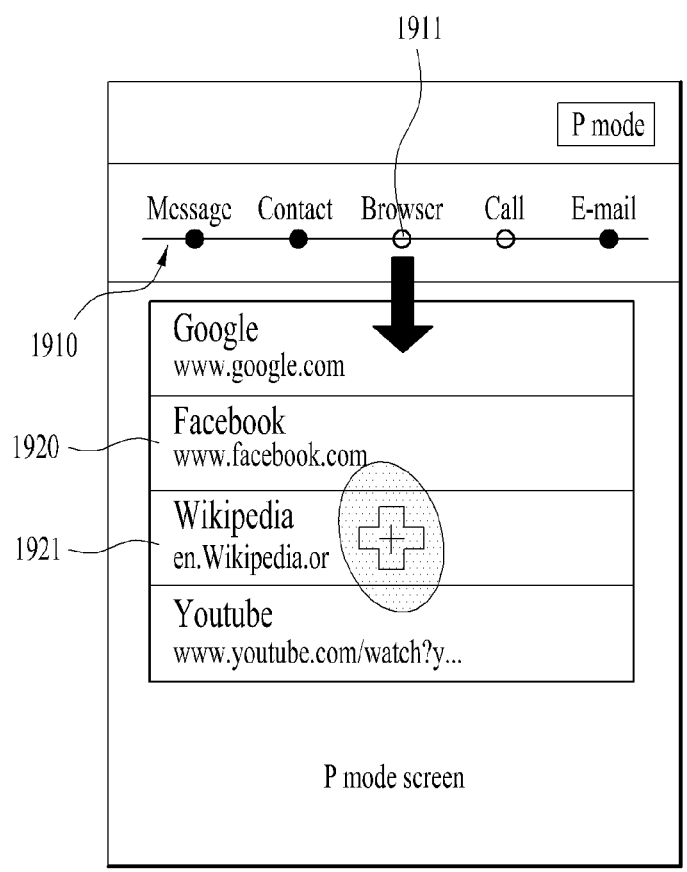
FIGS. 19A to 20B are diagrams for executing a specific application using additional information of the specific application contained in an application execution history according to the present invention.

Referring to FIG. 19A, when receiving an input of a command action of a specific additional information offer to an identifier 1911 of a browser application corresponding to a business mode in an application execution history 1910, the mobile terminal 100 can display a history 1920 of website addresses accessed in a browser application execution as an additional information. In this instance, the website addresses can be listed in order of an early access hour.

Figure 19B:
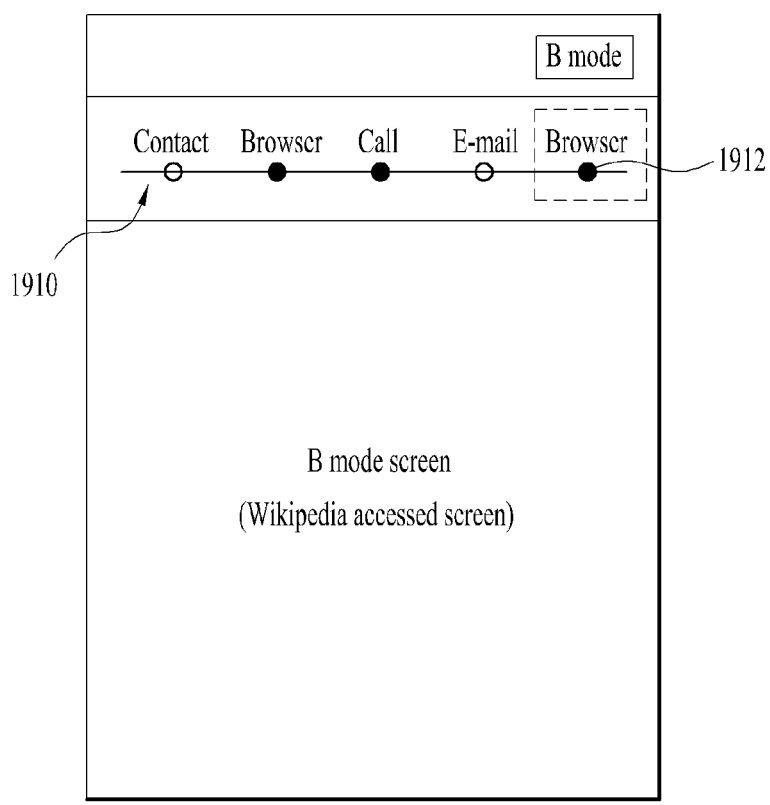

Referring to FIG. 19B, if a specific website address 1921 is selected from the history 1920 of the website addresses, the mobile terminal 100 enters the business mode and then executes the browser application as soon as accesses a specific website corresponding to the specific website address 1921. In this instance, an identifier 1912 of the browser application can be further added to the application execution history 1910.

Figure 20A:
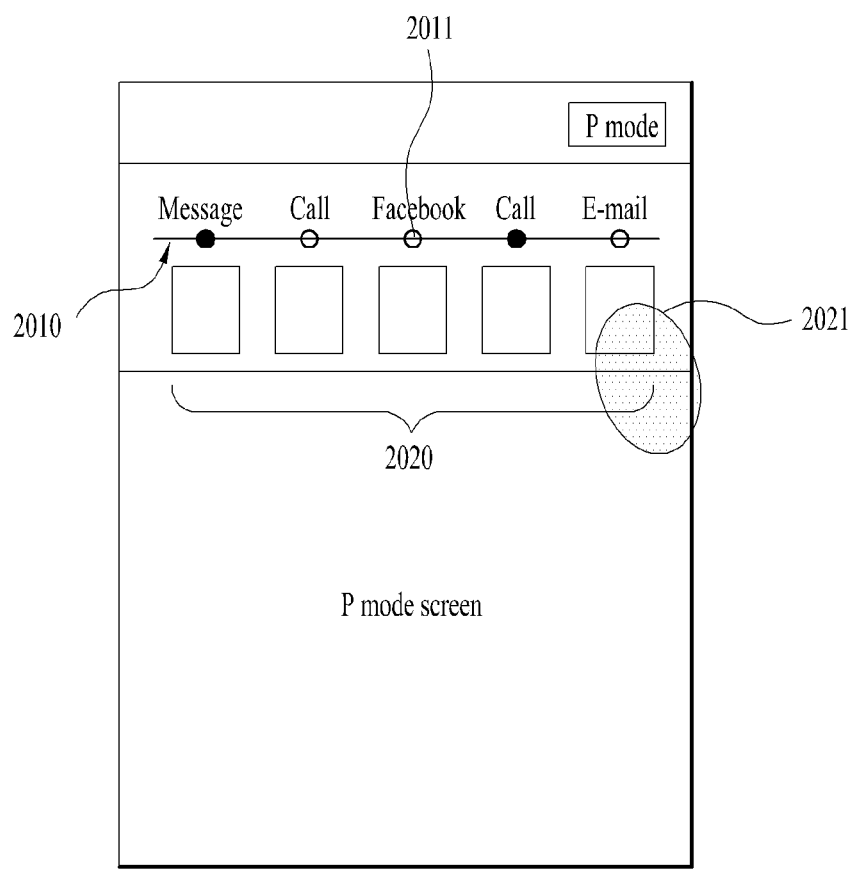

Referring to FIG. 20A, when receiving an input of a command action of a specific additional information offer to an identifier 2011 of a Facebook application corresponding to a business mode in an application execution history 2010, the mobile terminal 100 can display a history 2020 containing a list of contacts (e.g., friends registered in a Facebook account) having input data in the Facebook application execution as an additional information. In this instance, the contacts can be represented as images registered to Facebook and can be listed in order of an early data input hour thereof.

Figure 20B:
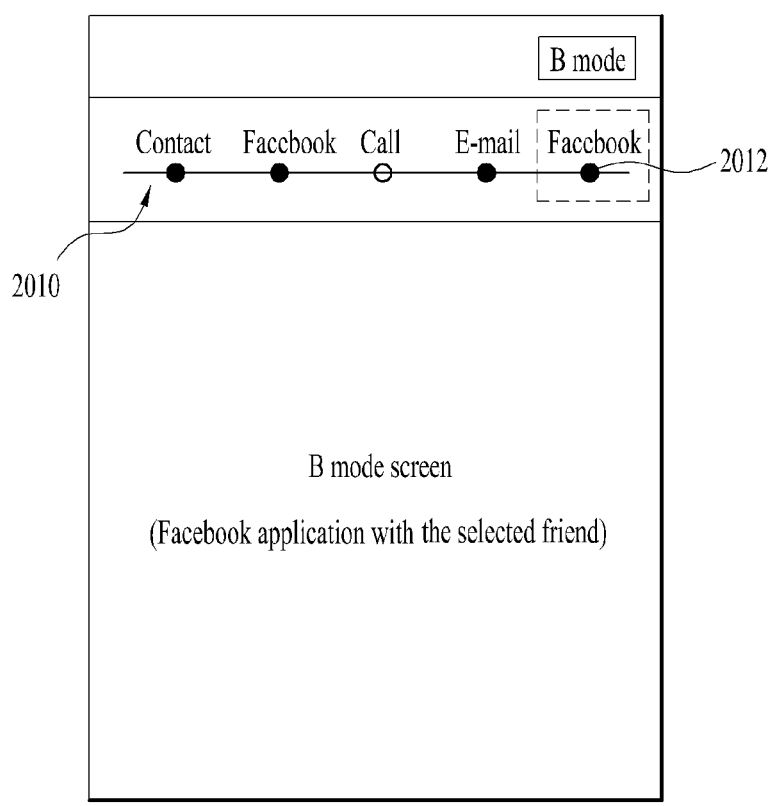

Referring to FIG. 20B, if a specific contact 2021 is selected from the history 2020, the mobile terminal 100 enters the business mode and then executes the Facebook application as soon as sets a sate for inputting data for the specific contact 2021. In this instance, an identifier 2012 of the Facebook application can be further added to the application execution history 2010.

The modes mentioned in the present specification can variously include a religion mode, a hobby mode, a school mode and the like per type in addition to a private mode and a business mode. In addition, a plurality of modes can be set for each type.

In determining an application executed per mode in the present specification, the mobile terminal 100 designate an application in accordance with a user selection. In addition, the mobile terminal 100 also automatically designate an application to a corresponding mode in consideration of a property and type of the corresponding application. For instance, assuming that a mode field exists in a data structure of an application, the mobile terminal 100 designate an application to a corresponding mode defined in the mode field.

In each of a plurality of modes mentioned in the present specification, a user interface related to at least one of a voice based communication and a text based communication can be provided via the display unit 151 under the control of the controller 180. For instance, the voice based communication includes a voice call, a voice based chatting and the like. In another instance, the text based communication can include a message service, a text based chatting and the like. The user interface is displayed as a virtual key form on a touchscreen or can be provided as a button key form. In addition, the user interface provided in each of a plurality of modes can differ in position, shape, size and the like.

According to one embodiment of the present invention, the above-described display controlling method in the mobile terminal can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet).

The aforementioned embodiments for the mobile terminal and mode switching controlling method therein are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
a communication unit configured to communicate with at least one external terminal;
a memory configured to store at least first and second operating systems including at least first and second modes, respectively; and
a controller configured to:
execute the first operating system and activate the first mode corresponding to the first operating system,
display a first information screen on a display unit of the mobile terminal corresponding to the activated first mode,
simultaneously display a first application execution history for the first mode and a second application execution history for the second mode on a prescribed region of the first information screen of the first mode, wherein the first application history and the second application history are displayed on separate lines,
identifiably display whether applications included in the application execution history were executed in the first mode or the second mode, and
merge together the first application history and the second application history into a single line based on a predetermined touch action on the display unit,
wherein the memory includes first and second database storage regions corresponding to the first and second modes, respectively, and a common database region in common with the first and second modes, and
wherein the first and second storage regions are restricted based on the mode and the first and second modes share the common database region.

2. The mobile terminal of claim 1, wherein the controller is further configured to control the display unit to display the applications included in the application execution history with reference to an application execution hour.

3. The mobile terminal of claim 1, wherein the controller is further configured to control the display unit to sort and display the application execution history in accordance with one or more of an application executed mode, an application executed time period and an application belonging category.

4. The mobile terminal of claim 1, further comprising:
a user input unit configured to receive an input of a selection action on a specific application executed in the second mode among the applications included in the application execution history,
wherein if the selection action is input, the controller is further configured to activate the second mode, deactivate the first mode and then execute the specific application in the activated second mode.

5. The mobile terminal of claim 4, wherein the controller is further configured to request a prescribed authentication procedure to enter the second mode, and
wherein if the prescribed authentication procedure is validly performed, the controller activates the second mode and deactivates the first mode.

6. The mobile terminal of claim 1, further comprising:
a user input unit configured to receive an input of a prescribed command action on the application execution history,
wherein if the prescribed command action is input, the controller is further configured to control the display unit to display additional information on the applications included in the application execution history.

7. The mobile terminal of claim 6, wherein the controller is further configured to control the display unit to limitedly display the additional information on applications executed in the second mode among the applications included in the application execution history.

8. The mobile terminal of claim 6, wherein the additional information includes one or more of a representative image of a corresponding application, a latest execution screen of the corresponding application and a history of data used in executing the corresponding application.

9. The mobile terminal of claim 1, further comprising:
a user input unit configured to receive a prescribed command action on the application execution history,
wherein if the command action is input, the controller is further configured to control the display unit not to display at least one application corresponding to a partial section among the applications included in the application execution history.

10. The mobile terminal of claim 1, wherein the controller is further configured to execute a specific application in the activated first mode, and control the display unit to display a history of a plurality of data used in accordance with the execution of the specific application.

11. The mobile terminal of claim 1, further comprising:
a memory configured to store execution related information on an application per mode under the control of the controller,
wherein the controller is further configured to generate the application execution history using the stored execution related information of the application.

12. The mobile terminal of claim 1, wherein the first and second modes are identified from each other according to one or more of a mode indicator, a database storage region, an operating system, a user access authority, an application configuration, a content configuration, a data configuration and an application property.

13. A method of controlling a mobile terminal, the method comprising:
allowing, via a communication unit of the mobile terminal, communication with at least one external terminal;
storing, via a memory of the mobile terminal, at least first and second operating systems including at least first and second modes, respectively;
executing, via a controller of the mobile terminal, the first operating system and activating the first mode corresponding to the first operating system;
displaying, via a display unit of the mobile terminal, a first information screen corresponding to the activated first mode;
simultaneously displaying, via the display unit, a first application execution history for the first mode and a second application execution history for the second mode on a prescribed region of the first information screen of the first mode, wherein the first application history and the second application history are displayed on separate lines;
identifiably displaying, via the controller controlling the display unit, whether applications included in the application execution history were executed in the first mode or the second mode; and
merging together, via the controller, the first application history and the second application history into a single line based on a predetermined touch action on the display unit,
wherein the memory includes first and second database storage regions corresponding to the first and second modes, respectively, and a common database region in common with the first and second modes, and
wherein the first and second storage regions are restricted based on the mode and the first and second modes share the common database region.

14. The method of claim 13, further comprising:
displaying the applications included in the application execution history with reference to an application execution hour.

15. The method of claim 13, further comprising:
sorting and displaying the application execution history in accordance with one or more of an application executed mode, an application executed time period and an application belonging category.

16. The method of claim 13, further comprising:
receiving, via a user input unit of the mobile terminal, an input of a selection action on a specific application executed in the second mode among the applications included in the application execution history; and
activating the second mode, deactivating the first mode and then executing the specific application in the activated second mode, if the selection action is input.

17. The method of claim 13, further comprising:
receiving, via a user input unit of the mobile terminal, an input of a prescribed command action on the application execution history; and
displaying additional information on the applications contained in the application execution history, if the prescribed command action is input.

18. The method of claim 17, further comprising:
limitedly displaying the additional information on applications executed in the second mode among the applications included in the application execution history,
wherein the additional information includes one or more of a representative image of a corresponding application, a latest execution screen of the corresponding application and a history of data used in executing the corresponding application.

19. The method of claim 13, further comprising:
receiving, via a user input unit of the mobile terminal, a prescribed command action on the application execution history; and
not displaying at least one application corresponding to a partial section among the applications included in the application execution history on the application execution history, if the command action is input.

20. The method of claim 13, further comprising:
executing a specific application in the activated first mode; and
displaying a history of a plurality of data used in accordance with the execution of the specific application.

* * * * *